US012286793B2

(12) United States Patent
Jones et al.

(10) Patent No.: US 12,286,793 B2
(45) Date of Patent: Apr. 29, 2025

(54) GUARD ASSEMBLIES

(71) Applicants: Luis Jones, Las Vegas, NV (US); Bradley Ward, Las Vegas, NV (US)

(72) Inventors: Luis Jones, Las Vegas, NV (US); Bradley Ward, Las Vegas, NV (US)

(73) Assignee: Luis Jones, Las Vegas, NV (US)

( * ) Notice: Subject to any disclaimer, the term of this patent is extended or adjusted under 35 U.S.C. 154(b) by 276 days.

(21) Appl. No.: 17/963,083

(22) Filed: Oct. 10, 2022

(65) Prior Publication Data

US 2023/0033898 A1 Feb. 2, 2023

Related U.S. Application Data

(63) Continuation of application No. 16/396,687, filed on Apr. 27, 2019, now Pat. No. 11,466,461.

(51) Int. Cl.

| | |
|---|---|
| ***E04F 11/032*** | (2006.01) |
| ***E04B 1/00*** | (2006.01) |
| ***E04F 11/18*** | (2006.01) |
| ***E06B 11/02*** | (2006.01) |

(52) U.S. Cl.

CPC .......... *E04F 11/032* (2013.01); *E04B 1/0007* (2013.01); *E04F 11/1865* (2013.01); *E06B 11/023* (2013.01)

(58) Field of Classification Search

CPC ... E04F 11/032; E04F 11/1865; E04B 1/0007; E06B 11/023; E06B 11/025; E01F 13/048; B65D 88/76

See application file for complete search history.

(56) References Cited

U.S. PATENT DOCUMENTS

| | | | | |
|---|---|---|---|---|
| 851,871 | A * | 4/1907 | Dickason .............. | E04F 11/064 182/98 |
| 1,259,060 | A | 3/1918 | West | |
| 1,683,365 | A | 9/1928 | Loudenslager | |

(Continued)

FOREIGN PATENT DOCUMENTS

| | | | |
|---|---|---|---|
| DE | 3003790 | A | 8/1981 |
| DE | 4217844 | A1 | 12/1993 |

(Continued)

OTHER PUBLICATIONS

Teicu, Spiral Cellar Design Makes Your Home Memorable, website located at https://freshome.com/spiral-cellar-design-makes-your-home-memorable/ , dated Jun. 18, 2015, last visited Apr. 27, 2019.

(Continued)

*Primary Examiner* — Gisele D Ford

(57) ABSTRACT

An example system in accordance with an aspect of the present disclosure includes an opening assembly and a guard assembly installable in a floor above an enclosed region. The opening assembly is actuatable between an open configuration to provide access to the enclosed region, and a closed configuration in which the opening assembly provides a closed surface. A guard assembly is mounted to the opening assembly and actuatable independent of the opening assembly, between a retracted configuration flush with the closed surface of the opening assembly, and a deployed configuration to serve as a guard for the opening assembly.

19 Claims, 17 Drawing Sheets

(56) References Cited

U.S. PATENT DOCUMENTS

| | | | | |
|---|---|---|---|---|
| 1,923,481 | A | | 8/1933 | Ford |
| 2,815,159 | A | | 12/1957 | Harmon |
| 3,455,414 | A | | 7/1969 | Higgins |
| 3,461,607 | A | | 8/1969 | Anderton |
| 3,521,537 | A | | 7/1970 | Forni |
| 3,921,449 | A | | 11/1975 | Hauffe |
| 4,048,766 | A | | 9/1977 | Dantzer |
| D257,133 | S | | 9/1980 | McKinnon |
| 4,231,201 | A | | 11/1980 | Harnois |
| 4,266,380 | A | | 5/1981 | Samolis |
| 4,378,862 | A | | 4/1983 | Carmel |
| 4,508,469 | A | | 4/1985 | Dumortier |
| 4,642,953 | A | | 2/1987 | DeGood |
| 4,706,423 | A | | 11/1987 | Cariteau et al. |
| 4,729,453 | A | | 3/1988 | Lyons, Sr. |
| 4,986,039 | A | | 1/1991 | Weisner |
| 5,094,054 | A | | 3/1992 | Arends |
| 5,632,124 | A | * | 5/1997 | Weingarten ........... E04F 11/032 182/187 |
| 5,819,471 | A | | 10/1998 | Koerber |
| 5,931,258 | A | | 8/1999 | Lorentz |
| 5,941,024 | A | | 8/1999 | Journault |
| 6,105,905 | A | | 8/2000 | Spence |
| 6,125,598 | A | | 10/2000 | Lanphier |
| 6,227,523 | B1 | | 5/2001 | Haberlen |
| 6,754,995 | B1 | | 6/2004 | Davis |
| 7,428,800 | B1 | | 9/2008 | Vaughn |
| 7,448,512 | B2 | | 11/2008 | Hauer |
| 7,677,614 | B2 | | 3/2010 | Monig |
| 8,677,689 | B1 | | 3/2014 | Draper |
| D720,167 | S | | 12/2014 | Jacob |
| 9,316,036 | B2 | | 4/2016 | Collene |
| 10,053,114 | B2 | | 8/2018 | Lieber |
| 10,132,053 | B1 | | 11/2018 | Hughes |
| 10,550,539 | B1 | | 2/2020 | Madruga |
| 10,851,871 | B2 | | 12/2020 | Hall |
| 2003/0037489 | A1 | | 2/2003 | McKernan |
| 2005/0210776 | A1 | | 9/2005 | Mills |
| 2010/0098486 | A1 | | 4/2010 | Miracle |
| 2010/0308294 | A1 | | 12/2010 | Watkins |
| 2011/0302851 | A1 | | 12/2011 | Entezari |
| 2014/0026486 | A1 | | 1/2014 | Vavaris |
| 2016/0168818 | A1 | | 6/2016 | Harazim |
| 2016/0280237 | A1 | | 9/2016 | Thompson |
| 2018/0016809 | A1 | | 1/2018 | Hyland |
| 2020/0024820 | A1 | * | 1/2020 | Madruga ................... E06B 5/01 |
| 2020/0080315 | A1 | * | 3/2020 | Shelton ............... E04F 11/1865 |
| 2020/0087932 | A1 | * | 3/2020 | Phan ....................... E04G 5/142 |
| 2021/0010271 | A1 | | 1/2021 | Burger |
| 2023/0399851 | A1 | * | 12/2023 | Francis ................. E04F 11/181 |

FOREIGN PATENT DOCUMENTS

| | | | |
|---|---|---|---|
| DE | 202013003089 | U1 | 4/2013 |
| EP | 128989 | | 12/1984 |
| EP | 191708 | A | 8/1986 |
| EP | 1953318 | A1 | 8/2008 |
| EP | 2378025 | A1 | 10/2011 |
| EP | 2392736 | A1 | 12/2011 |
| FR | 2255445 | A | 8/1975 |
| FR | 2341716 | A1 | 9/1977 |
| FR | 2434910 | A | 4/1980 |
| FR | 2729693 | A1 | 7/1996 |
| FR | 2849459 | A1 | 7/2004 |
| FR | 2972735 | A1 | 9/2012 |
| FR | 2978464 | A1 | 2/2013 |
| FR | 3022934 | A1 | 1/2016 |
| FR | 3035890 | A1 | 11/2016 |
| GB | 2099898 | A | 12/1982 |
| JP | 2003056183 | A | 3/2003 |
| JP | 2006029599 | A | 2/2006 |
| RU | 2029837 | C1 | 2/1995 |

OTHER PUBLICATIONS

Lavinia, Indoor Spiral Wine Cellar, website located at https://freshome.com/2009/10/05/indoor-spiral-wine-cellar/ , dated Oct. 5, 2009, last visited Apr. 27, 2019.

Machine Translation of RU 2029837 C1 obtained from the European Patent Office (Year: 1995).

Derwent Abstract of CN 204764302 U (Year: 2015).

Self-Build Original Spiral Cellar Kit by Spiral Cellars (last accessed on Mar. 4, 2021 at Http://www.spiralcellars.co.uk/wp-content/uploads/2017/03/Original-Cellar-Broshure.pdf) (Year: 2017).

* cited by examiner

GUARD ASSEMBLIES

CROSS-REFERENCE TO RELATED APPLICATIONS

This application is a continuation of U.S. non-provisional application Ser. No. 16/396,687 entitled "Actuatable Assemblies" filed on Apr. 27, 2019, the disclosure of which is incorporated by reference in its entirety.

BACKGROUND

A cellar entry provides access to a cellar, but can involve inconvenience and delay for opening the cellar entry. Furthermore, once opened, the cellar entry can impose additional constraints for cellar ingress and egress, posing challenge and inconvenience, discomfort, or safety hazards.

BRIEF DESCRIPTION OF THE DRAWINGS/FIGURES

DETAILED DESCRIPTION

Figure 1:
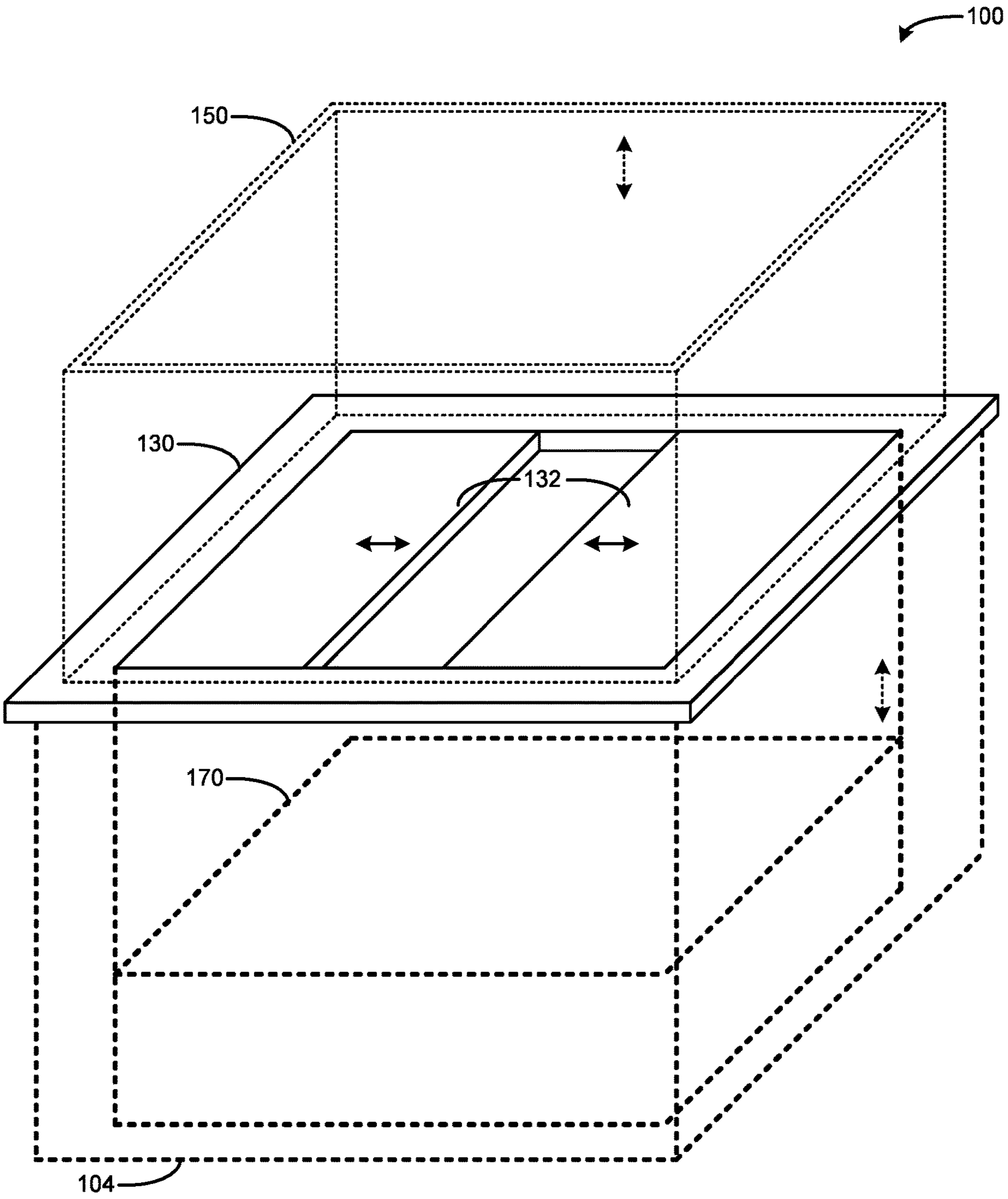
FIG. 1 is a perspective diagram of a system including an opening assembly and a guard assembly according to an example.

Various approaches can be used for cellar entries. For cellar entries installed in a floor, the cellar entry itself poses a tripping and falling hazard. The cellar entry can be constrained by a need to accommodate ingress and egress. Actuated cellar entries can impose additional hazards, e.g., by opening mechanisms intruding into ingress and egress space that a user must avoid. Cellar entries can be visually unappealing, and can be awkwardly large and heavy. A cellar entry may provide insufficient headroom clearance, imposing a need for crouching or ducking during ingress and egress, and when accessing the storage area of the cellar. Furthermore, such constraints can impose limitations on aspects of the cellar, such as requiring awkwardly spaced steps, or steps having unusually large height spacing between steps. Such various features can even impose design constraints on the cellar entry that causes the cellar entry to be in violation of safety codes, building regulations, or other guidelines.

Various example embodiments described herein include systems and methods that overcome the challenges described above. For example, a system can include an actuatable door(s) installed at floor level, made safe by a guard assembly that rises out of the floor according to a predetermined control system. For example, to open the doors, the guard assembly is raised into a deployed position for safety, the door(s) open, and a gate portion of the guard assembly lowers to allow ingress and egress through the open door(s). An access assembly, such as an elevator or stairwell, actuates to facilitate ingress and egress. For the staircase embodiment, a center newel post is raised up when the doors are open, to provide a hand-hold at a convenient height for ingress and egress. Such automatic assemblies are configured and operated without violating safety or building codes, and include safety features with multiple levels of redundancy. For example, some embodiments described herein provide a continuity of handrail for the full length of the staircase, provide guards along open-sided walking surfaces having a vertical drop of more than 30 inches, and provide a guard height of not less than 36 inches. The embodiments described herein can be configured and arranged to accommodate variations in such codes and rules, e.g., by adjusting the retraction and deployment extent of an actuator via control software.

Example embodiments described herein, when in a closed configuration, provide a level, closed, walking surface, which does not need a guard or handrail because the closed surface protects the underlying access assembly (e.g., staircase or elevator) and provides a flush, smooth surface that does not pose a tripping hazard. Before opening, an engineered, automated control system activates and raises the guard assembly to provide, e.g., a fixed-height 42-inch guardrail, and the control system closes the door(s) and lowers the guard assembly after the enclosed space (e.g., cellar) has been vacated. The example control system raises a handrail newel post, e.g., to a height of 36 inches after the door is open, and lowers the post during or after door closure. Such assemblies, including example embodiments of the guard assembly and post of the access assembly or their constituent parts, are deployable and retractable independent from operation of each other and the door(s). Embodiments include engineered fail-safe systems, to prevent doors from opening without the guard in place, to keep the door open, to keep the handrail extended, and to keep the guard assembly up while the storage space is occupied. Furthermore, systems can be manually released, and include systems to enable the door(s) to fail-safe to an open position by operation of a counterweight without a need for power.

Example embodiments include doors having sufficient size to provide safe and comfortable ingress and egress through the opening assembly. Accordingly, a spiral staircase access assembly can be dimensioned to enable a user to traverse the spiral staircase safely without needing to stoop under a door, under the floor, and/or under a landing of the staircase in traversing around the staircase. An elevator access assembly can be dimensioned to enable hand trucks and various storage units to be loaded onto the elevator platform, to facilitate fast and efficient loading or unloading of an enclosed space beneath the opening assembly (e.g., a cellar).

FIG. 1 is a perspective diagram of a system 100 including an opening assembly 130 and a guard assembly 150 according to an example. The opening assembly is disposed above an enclosed region 104 and includes a plurality of doors 132, to provide access to the enclosed region 104 via an access assembly 170.

The opening assembly 130 is installable in a floor above the enclosed region 104. In an example, the opening assembly 130 includes extensions that extend laterally into the floor, to suspend the system 100 from the floor structure. The opening assembly 130 is actuatable between an open configuration to provide access to the enclosed region 104, and a closed configuration in which the opening assembly 130 provides a closed surface. As illustrated, the doors 132 of the opening assembly 130 are sliding doors that are partially open. In other example embodiments, the door(s) 132 operate based on opening and closing on hinges, rotating/pivoting, irising, swiveling, or other arrangements.

In the illustrated example, the guard assembly 150 is mounted to the opening assembly 130. Accordingly, the guard assembly 150 is coupled indirectly to the floor foundation via the opening assembly (which is suspended from the floor). In other example embodiments, the guard assembly is mounted directly to the floor, independent of the opening assembly, and is installable into the floor independent of the opening assembly 130. The guard assembly 150 is actuatable independent of the opening assembly 130, between a retracted configuration (e.g., a top of the guard assembly 150 being flush with the closed surface of the opening assembly 130), and a deployed configuration (as illustrated in dashed lines) to serve as a guard for the opening assembly 130.

In example embodiments, a control system (not shown in FIG. 1) of the system 100 automatically operates the various assemblies of the system 100, e.g., deploying the guard assembly 150, and retracting a gate portion of the guard assembly 150, prior to actuating the opening assembly 130 to open the doors 132. Thus, the system 100 complies with building codes, includes fail safe operation with multiple safety features and redundancies, and is operable in the absence of power.

Figure 2:
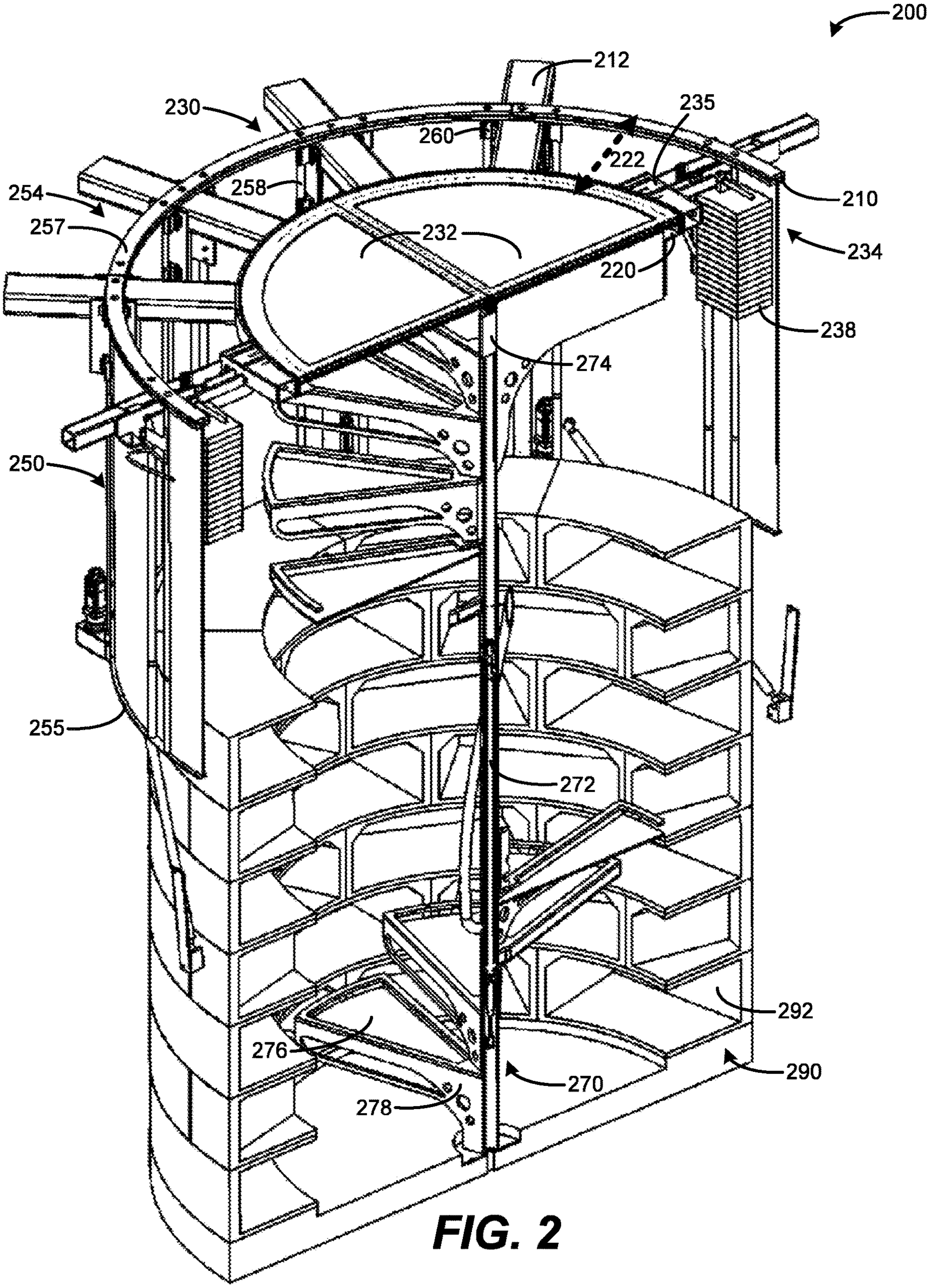
FIG. 2 is a perspective cross-section view of a system including an opening assembly, a guard assembly, an access assembly, and a storage assembly according to an example.

FIG. 2 is a perspective cross-section view of a system 200 including an opening assembly 230, a guard assembly 250, an access assembly 270, and a storage assembly 290 according to an example. The opening assembly 230 includes a double door system of two actuatable semicircular doors 232 (shown in cross-section, each remaining visible half-section forming a quarter). Each door 232 includes a corresponding independent counterweight 238 and hinge 235.

In other example embodiments, one (or both) of the semicircular doors 232 is divided into two quarter doors (e.g., one semicircle door and two quarter doors). For example, the illustrated semicircular door 232, half of which extends over the landing of the staircase, can be formed as two quarter doors, one of which is opened to reveal the landing, and the other of which opens partially to position a quarter edge of the quarter door, which faces toward the landing, at a height (e.g., opened at approximately 45 degrees) that serves as a guardrail to prevent a user from traversing over a kick panel of the landing, as well as serving as a handhold via the edge of the partially opened quarter door. Such an arrangement is similar to either one of the doors 332 as illustrated in FIG. 3B, except that one of the doors would be moved out of the way to expose the edge of the other door as illustrated, to serve as a stable handhold. In other example embodiments, the kick panel can include an extension guard, which is configured to extend upward (e.g., independently actuated, or actuated along with the actuated newel post of the staircase) to provide a guard and/or guardrail at the far edge of the staircase landing (see extension guard 488 shown in dashed lines in FIG. 4 extending upward from the kick panel of the landing 475).

In an example, four actuatable quarter doors are used. Such doors are configurable to open in an aesthetically pleasing manner and orientation, such as by beginning to open the first quarter door over the staircase landing to full 90 degrees, then before the first quarter door finishes opening, begin opening the next quarter door along the ingress path to 65 degrees, and so on. An arbitrary number of T total doors can be opened in this manner, e.g., by opening an $n^{th}$ door of the total T doors to an angle of $(90-(n\times(90/T))$. Accordingly, as a user traverses down the stairway, the decreasing head clearance below the partially opened doors mirrors the increasing foot room caused by traversing down the spiral staircase path. In another example, two doors are used with one door remaining fixed, and one door being actuatable. The opening assembly 230 also includes a plurality of support arms 212, coupled to an inner support 220, to form a support gap 222 around the inner support 220. The illustrated example support gap 222 spans an outer extent of an outer support 210 and an inner extent of the inner support 220. The doors 232 are hingedly mounted to the inner support 220 of the opening assembly 230. A door actuation system 234 is coupled to the doors to actuate the doors between an open configuration (to provide access through the opening assembly 230), and a closed configuration (as illustrated in FIG. 2), in which the doors provide a closed surface.

The guard assembly 250 is supported by the plurality of support arms 212. A given support arm 212 is configured to slidably mount the guard assembly 250 and allow a corresponding shaft 258 of the guard assembly 250 to pass through the support arm 212. Bearings 260 mounted to the support arms 212 enable the shafts 258 of the guard assembly 250 to smoothly slide. Particular customized features are engineered into a configuration of the shafts 258, bearings 260, and guard assembly 250 to avoid binding of the guard assembly 250. The guard assembly 250 includes a guardrail 254 and a gate. The guardrail 254 includes an upper guard support 257 and a lower guard support 255. The guard assembly 250 is actuatable between a retracted configuration flush with the closed surface (as illustrated), and a deployed configuration (not shown in FIG. 2; see FIG. 3A) to prevent access to the doors 232. The guardrail 254 and the gate are independently actuatable from each other and the opening assembly 230.

The access assembly 270 is mounted to the opening assembly 230 for ingress and egress through the opening assembly 230. As illustrated, the access assembly 270 is also mounted to a base of the enclosed region. The access assembly 270 illustrated in FIG. 2 is a custom spiral staircase, including a plurality of cantilevered steps 276 each having webbing 278 to interconnect the plurality of steps to each other for strength and support, and also to a central support 272 of the access assembly 270. An actuatable newel post 274 is extendible from and retractable into the central support 272, e.g., when the doors 232 are opened or closed. In other example embodiments, the access assembly 270 is provided as a straight staircase, which can extend in a straight line, e.g., from a first edge of the enclosed space to a second edge (e.g., to a location that is further hollowed out in a side of the enclosed space, allowing room for the straight staircase to extend into, extending the staircase even beyond a lateral extent of the opening assembly into a side of the enclosed space.

In another example embodiment, the access assembly for ingress and egress through the opening assembly 230 is an actuatable elevator platform. For example, a hydraulic plunger can be installed into a base of the enclosed region, or suspended from the opening assembly 230, to enable the elevator platform to raise or lower according to a system control system.

The storage assembly 290 is disposed in the enclosed region, below the opening assembly 230 and encircled at least in part by the guard assembly 250 in the retracted configuration. The storage assembly 290 can be formed as a unitary structure, e.g., poured concrete. In another example, the storage assembly 290 is modular and formed by the plurality of stacked wall accessories 292. The wall accessories 292 are configured to form at least a portion of a wall surrounding the enclosed region under the opening assembly 230. Behind the wall accessories 292, a surface of the surrounding enclosed space faces the back of the wall accessories 292. The surrounding enclosed space can be thickened and reinforced, to further provide thermal stability and temperature retention. For example, dual six-inch layers of concreted are poured to form the walls of the enclosed space, providing a twelve-inch thickness of concrete. Such concrete readily retains the cooled temperature of the enclosed space, and enables the enclosed space to retain a desired temperature even in the situation of a power failure. The gap between the walls of the enclosed space and the wall accessories 292 is thereby surrounded by materials that readily retain temperatures and help to maintain a steady desired temperature, even in the event of power failure.

The storage assembly 290 illustrated in FIG. 2 has been stacked to a height that leaves a storage area between a top of the storage assembly 290 and an underside of the opening assembly 230. Such illustrated storage area is open without partitions, providing ample space for larger items that do not fit into a wall accessory 292. An outer diameter of the storage assembly 290 is dimensioned as shown to provide space around it for the guard assembly to move between the retracted configuration (as illustrated) and the deployed configuration. Accordingly, the guard assembly 250 in the illustrated retracted configuration surrounds at least a portion of the storage assembly 290, and at least a counterweight 238 of the door actuation system 234.

Referring back to the opening assembly 230, the illustrated example hinge 235 is formed as a box enclosure, including a door axle with bearings and one or more adjusters, e.g., threaded adjustable stoppers aligned to provide fine alignment of arms of the door along two axes perpendicular to the hinge axle, and aligned axially to control side-to-side drift of the door 232 in the hinge 235.

Other example embodiments can include custom door shapes, such as non-circular geometric shapes, novelty shapes (e.g., in the shape of a state of the U.S.A., in the shape of a college logo, etc.), or any arbitrary shapes being possible. As illustrated, the doors are formed as a structural frame supporting a transparent inlay material. For example, the doors 232 include a laminated structural glass having a non-slip texture. In an example, the door is machined out of a solid billet, to provide strength and rigidity while enabling customized shapes. As illustrated, the doors 232 in the closed configuration sit inside the ring formed by the inner support 220, enabling the doors to sit flush with the floor level to provide a closed surface. In another example embodiment, the inner support is recessed further down, e.g., another quarter inch below, such that the inner support sits below the floor level, and the doors 232 can close sitting on top of the inner support 220. As illustrated, the inner support 220 is formed as a ring of quarter angle, providing a space in which the doors 232 can rest, surrounded on sides of the door by the inner support 220 and also supported underneath by a floor lip section of the inner support 220.

In example embodiments, components of the opening assembly 230, door frames, and various other illustrated components can be made of stainless steel. The support arms 212 can be formed of 3"×6"×0.25" hollow rectangular steel sections that tie the inner support 220, and/or the outer support 210, to the surrounding floor (e.g., to rebar and slab of a concrete floor). The structure is robust and capable of easily supporting, e.g., door hinges 235 carrying a 640 pound force load expected from each door 232 (e.g., semi-circular doors which when closed form a circle approximately 6 feet in diameter) and counterweight 238, in addition to load bearing weight from people standing on top of the closed surface formed by the doors 232 in the illustrated closed configuration.

In the illustrated embodiment of system 200, mounting and support for the entire system 200, including the doors 232 and the guard assembly 250, can be provided from the floor level in which system 200 is mounted. Accordingly, the system 200 is secured without a need to build up structure beneath the opening assembly 230, which instead is anchored into the floor at floor level (e.g., flush with the closed surface formed by closed doors 232). Accordingly, the doors 232 in the illustrated closed configuration enable the doors to serve as usable floor space that can be walked upon, with robust support provided by the support arms 212. The support arms 212 are illustrated extending radially away from the system 200, which enables them to extend sufficiently into a surrounding floor into which they are anchored. The extent to which the support arms 212 extend is variable, to accommodate different floor layouts or other constraints. The support arms 212 are shown formed with a closed box cross-section. In other examples, the support arms 212 have a C-channel cross-section instead of box beam, or can be formed as a flat plank.

Referring back to the storage assembly 290, the storage assembly 290 is free-standing, built up by stacking modular wall accessories 292 on a floor of the enclosed region. Accordingly, the wall accessories 292 can be formed with a thinner structure that does not need to be load bearing, reducing a wall thickness of the wall accessories 292, maximizing storage space for storing items. The staircase access assembly 270 is shown mounted to the floor of the enclosed space for stability, and does not come in contact with the storage assembly 290. In other examples, the staircase can be fully suspended from the opening assembly 230. In the illustrated example, an upper portion of the access assembly 270 includes a platform that is welded to the inner support 220, ensuring that the stairwell is stable and will not rock around or come into contact with the storage assembly 290 while being used for ingress and egress by a person. The steps 276 of the staircase are cantilevered and supported by their own webbing 278 for sufficient rigidity and support, without needing to be connected to the storage assembly 290.

The doors 232 are automatically biased toward the open configuration by virtue of the counterweights 238, such that gravity will induce the doors 232 to open in response to a mechanical release being activated, even in the absence of power. In other examples, the doors 232 are balanced neutrally (not biased toward the open or closed configuration) or are biased toward the closed configuration. The doors 232 can be balanced in a manner that allows the balanced and/or biased doors to be manually pushed open by a user without difficulty, e.g., after activating a mechanical release. In an example configuration, the two doors 232 weigh 200 pounds each, and the two counterweights weigh 400 pounds each, while being suspended by the support arms 212 anchored to the foundation at floor level. The system 200 is carefully balanced to provide 1) bias toward an open configuration, while also 2) providing the doors 212 with enough resistance to enable a safety feature of door actuators (not readily visible in FIG. 2; see FIG. 8A) which can detect a door obstruction via resistance to actuation to generate an actuator control feedback signal that can be sensed, e.g., by a system controller. Accordingly, despite relatively large door weights, the system 200 is capable of detecting when there is an obstruction, and finely limit torque applied by door actuators. The counterweight 238 is balanced with the door to allow the feedback to be very low, enabling a low torque threshold much lower than the relatively large overall door weight. Accordingly, a wide variety of door actuators can be used, providing a range of torque that does not need to be the maximum driving 1100 lbs. of torque to lift the entire door using torque alone (although such embodiments are contemplated).

The overall structure of system 200 is robust to support large weights. For example, in the illustrated example embodiment, the guard assembly 250 is approximately 800 pounds, and includes a gate of 200 pounds, plus actuators for the guard assembly 250. Furthermore, the walkable closed surface formed by doors 232 (and surrounding assemblies) is engineered to support an additional live load (e.g., people standing atop the system 200) of 2300 pounds, beyond the existing weight of the system 200. As for size, in the illustrated embodiment, the diameter of the doors 232 corresponding to the inner support 220 is approximately 60 inches, and the diameter of the outer support 210, corresponding to an upper guard support 257 of a guardrail 254 of the guard assembly 250, is approximately 102 inches.

The double doors 232 both being actuated to an open configuration enables the system 200 to provide ample head room above the access assembly 270 for ingress and egress without having to duck or crouch under a surface (such as a fixed door, or the floor, in a configuration where only half of the access assembly 270 is uncovered by an opening), by virtue of enabling the entire access assembly 270 to be uncovered. The system 200 enables such high head clearance, and a user can traverse nearly a full orbit of the staircase before passing under a landing of the staircase, without needing to crouch or duck under a fixed half-door or floor section. Accordingly, the illustrated system 200 enables, e.g., an 80 inch clearance, providing great flexibility in vertical spacing between stair steps, and other engineering design parameters regarding ingress and egress.

Referring back to the storage space formed below the opening assembly 230 and above the storage assembly 290, such unstructured storage space is customizable based on how high the wall accessories 292 are stacked. In the illustrated embodiment, the storage assembly 290 is stacked seven layers high. In other examples, the storage assembly 290 can be stacked with fewer or greater numbers of layers.

The unstructured storage space can be used to store various objects, such as cases of wine, barrels, kegs of beer, and the like. In an example embodiment, kegs or barrels are attached to hoses passing through the opening assembly 230 to floor level, to feed wine or beer to a dispenser that rises from the floor as an accessory (see FIG. 7 for accessory 780). The dispenser accessory is retractable under the floor, which places it in inside the enclosed space (e.g., cellar) to ensure the dispenser and its fluid remains cold. The hoses and dispenser can be kept at proper dispensing temperatures from being stored within the enclosed space, by virtue of the dispenser provided as an actuatable accessory that is deployed above the floor level and retracted back into the enclosed region beneath the opening assembly 230.

In an embodiment, the enclosed region is provided with a conditioned environment, e.g., by an air conditioning unit (not shown). The air conditioning unit can be located external to the system 200, or can be contained within the system 200, e.g., placed in the unstructured storage space or structured and positioned as a wall accessory 292 in the storage assembly 290. In an embodiment, conditioned air is routed through various air ducts, and the wall accessories 292 include various ports, slots, ducts, or other passages to allow air to circulate through the wall accessories 292. In an example embodiment, airflow movement is controlled through the wall accessories 292 to introduce conditioned cool air at a top of the enclosed space, with an air return at the bottom of the enclosed space. An upper area, e.g., at least a portion of the unstructured storage space, of the enclosed region can be kept with stagnant, uncirculated air to serve as an insulating border between the opening assembly 230 and the lower cooled circulating air. For example, an upper portion, e.g., a depth of two feet below the floor surface, of stagnant air is used as an insulating border. Furthermore, although not shown in FIG. 2 (see cover 677 of FIG. 6), embodiments can include a cover to isolate the unstructured storage area from the access assembly 270, including optional partitions to establish the insulating air space from a cooled portion of the unstructured storage area and/or the storage assembly 290. In an example, the cover isolates external air, e.g., air introduced by opening of the doors 232, from cooled air in the enclosed region. In embodiments, the cover further encourages proper circulation of the cooled air, e.g., by allowing a cooled plenum to receive one or more supply air lines via a manifold connected to an air conditioner. An example system 200 includes seven air returns each having a diameter of three inches, with a network of air tubing routed behind the storage assembly 290 to a supply manifold coupled to the air conditioning unit, which then supplies conditioned air to a supply manifold and one or more supply lines.

Accordingly, embodiments of the system 200 can include an air circulation system to circulate cooled air introduced at a top of the enclosed region, (below the stagnant air layer, if the embodiment includes such a layer) to be collected at the bottom of the enclosed region for recirculation. The stagnant air layer can be used to maintain a temperature and humidity environment for portions of the opening assembly and other structures that minimizes formation of condensation, or provides other environmental conditions that protect good operation and longevity of the system 200. Such conditions can be adjusted in view of the expected environmental conditions above the opening assembly 230, e.g., the environmental conditions of the room above the system 200 (e.g., whether the room is warm and humid in a tropical environment, or cool and dry in a northern environment, which calls for suitably matching transition environment in the stagnant air space, which can be adjusted with a separate setting for partially diverting some of the conditioned air to the stagnant air space as needed to maintain the desired stagnant air environment). In other embodiments, the upper air layer is actively cooled and/or circulated with conditioned air, to thereby maintain a cool condition for at least one accessory that has been retracted below floor level into the upper air space. Accordingly, when a user deploys the accessory, the accessory is entirely cooled. For example, a beverage can be kept cool in the conditioned air space, and can be dispensed by a dispenser accessory that is kept cool when retracted, including any feed lines and even the spout of the dispenser. Accordingly, the beverage can be dispensed under precisely controlled conditions without unwanted warming.

In example embodiments, the characteristics of the various components and assemblies are tailored to avoid condensation. For example, a heating accessory is coupled to the opening assembly 230 and/or other assemblies such as the guard assembly 250, to warm one or more structural assemblies of the system 200. The heating accessory is set warm enough to prevent the assemblies from attracting condensate, i.e., the system 200 (including a control system) is configured to direct the heating accessory to sufficiently warm components to prevent condensation formation when the otherwise cold components come in contact with warm/moist air in a room in which the system 200 is installed.

In an example embodiment, the enclosed region includes at least one air supply line positioned approximately two feet below a finished floor level, fed from lines positioned behind the storage assembly 290, with at least one air intake positioned at a base of the enclosed space, e.g., passing through a back of a wall accessory 292 at the base. The conditioned air drops through the blocks via various passages in upper and lower surfaces of the wall accessories 292. Such passages enable air circulation through the wall accessories 292, even if the wall accessories are loaded with stored items, such as wine bottles, regardless of whether the stored items block air passage through the front of the wall accessory 292.

In an example embodiment, the wall accessories 292 are structured to provide a thermal mass to provide a stabilizing influence on temperature in the enclosed space. For example, a back wall of the wall accessories 292 can be made relatively thicker than other walls of the wall accessories 292, to increase the thermal mass of the wall accessory 292, without the wall thickness substantially decreasing storage capacity of each block (e.g., compared to blocks having thicker floor, ceiling, and side walls). The wall accessories 292 can be formed of a material having an ability to readily maintain a cool temperature. For example, a relatively dense variation of concrete can be used to form the wall accessories, which provides greater thermal mass compared to standard density concrete or cinderblock, for example. In alternate examples, the wall accessories 292 are formed of a first material to provide structural support characteristics, and include a second material to provide thermal mass characteristics. An embodiment of the wall accessories 292 includes at least one exterior layer of venetian plaster, to provide self-healing properties to the wall accessories 292, e.g., the ability to sand off any dried wine stains or other stains, and prevent spilled wine from soaking deep into underlying surfaces of the wall accessories 292. An example venetian plaster layer has a thickness of approximately ⅛ inch.

Example storage assemblies include, e.g., wall accessories 292 structured and configured to fit wine bottles. In an example, the wall accessories 292 are structured to fit wine bottles inserted head first laying on their sides, and can include sub-structures to stabilize each bottle at a predetermined angle and presentation. The wall accessories 292 illustrated in FIG. 2 are configured to receive wine bottles three across, one deep. In other examples, the enclosed space is widened to a larger diameter, to accommodate double-depth, or even deeper, wall accessories 292, e.g., to fit multiple depths of rows of wine bottles (and a correspondingly wider enclosed space, and/or opening assembly, is also usable). In yet other example embodiments, a storage unit can be structured to store a fluid such as wine or beer, while being in the wedge shape that is stackable within the pattern of the storage assembly 290. In other embodiments, a customized wine cask or beer keg is fabricated as a wedge shape that is stackable within the pattern of the storage assembly 290. The system 200 can include an inventory system integrated with the system controller, and coupled to interact with a lighting system of the system 200. For example, an embodiment of the storage assembly 290 includes lighting with customizable brightness and color, and/or provides individual lighting for each wall accessory 292. Accordingly, the inventory system can identify a location of a desired wine by illuminating the corresponding storage location. A given wall accessory 292 can include individual lighting on a per-bottle basis, capable of illuminating a given bottle. Thus, a user can query for a particular type of wine at a control panel of the system, and the system 200 responds by illuminating the desired bottle at its location within the storage assembly 290. A similar lighting approach can be implemented with the access assembly. For example, a staircase can include customizable lighting features for steps or areaways, and can be integrated with the inventory control system to illuminate an area of the enclosed space, and/or to illuminate a step of the staircase, corresponding to a location of a queried item stored in the storage assembly. Various aesthetic or synchronized lighting displays can be incorporated into the system 200, such as using pressure or optical sensors in steps of the staircase (or at points in the ingress/egress pathways) to reactively illuminate the various components of the system 200 for entertainment or other purposes that are not specifically tied to inventory purposes.

Embodiments of the storage assembly 290 also include cask or keg shapes that are dimensioned to fit within the footprint of the ring formed by the upper layer of the storage assembly 290, e.g., a wedge, a curved rectangle, partial or full ring, or other suitable shapes. Such custom components of the storage assembly 290 can include handles and/or spouts, for facilitating dispensing of the beverages directly from the components. In other examples, the components include fluid couplings, to couple the components directly to dispensers disposed above in the opening assembly 230.

In example embodiments, the enclosed space includes an elevated floor ring (not shown), extending radially between an interior surface of an outer wall of the enclosed space, and an outer surface of the storage assembly. The elevated floor ring provides an elevated support surface above the floor of the enclosed space. The elevated floor ring can be used to support a service technician, and can catch items that might fall behind the storage assembly 290 to retain them at a height to allow the items to be easily retrieved. In an example, the elevated floor ring is provided as a lip extending inward toward the storage assembly 290 from an inner surface of the enclosed space behind the storage assembly 290. In another example, the elevated floor ring is provided as a lip extending outward toward an inner surface of the enclosed space. In another example, the elevated floor ring fully spans the radial distance. The elevated floor ring can be formed by a layer of customized wall accessories 290 having a rearward extension, and in other examples, can be formed by pouring a layer of concrete extending beyond and into the inner surface of the enclosed space, forming an integrated part of the wall that encloses the storage assembly 290 which is reinforced by rebar tied to reinforcements within the wall. In an example, the elevated floor ring is positioned at a height above the floor corresponding to two or three stacked wall accessories 292. The elevated floor ring has a thickness of approximately an inch or two, and can sit at a height of approximately eight feet beneath serviceable components (e.g., mounts for the guard assembly actuators). Accordingly, a service technician can stand on the elevated floor ring to reach and service various system components.

In example embodiments, the elevated floor ring seals off the airspace below the elevated floor ring from the airspace above it. The sealed-off lower space serves as a return plenum airspace, to contain a volume of return air which feeds return lines to the air conditioning unit. The lower wall accessories 292 that are below the level of the elevated floor ring include choke(s) to control the airflow from wall accessories 292 to the return plenum airspace. The return plenum airspace has ducts or tubing leading to the air conditioner.

Figure 3A:
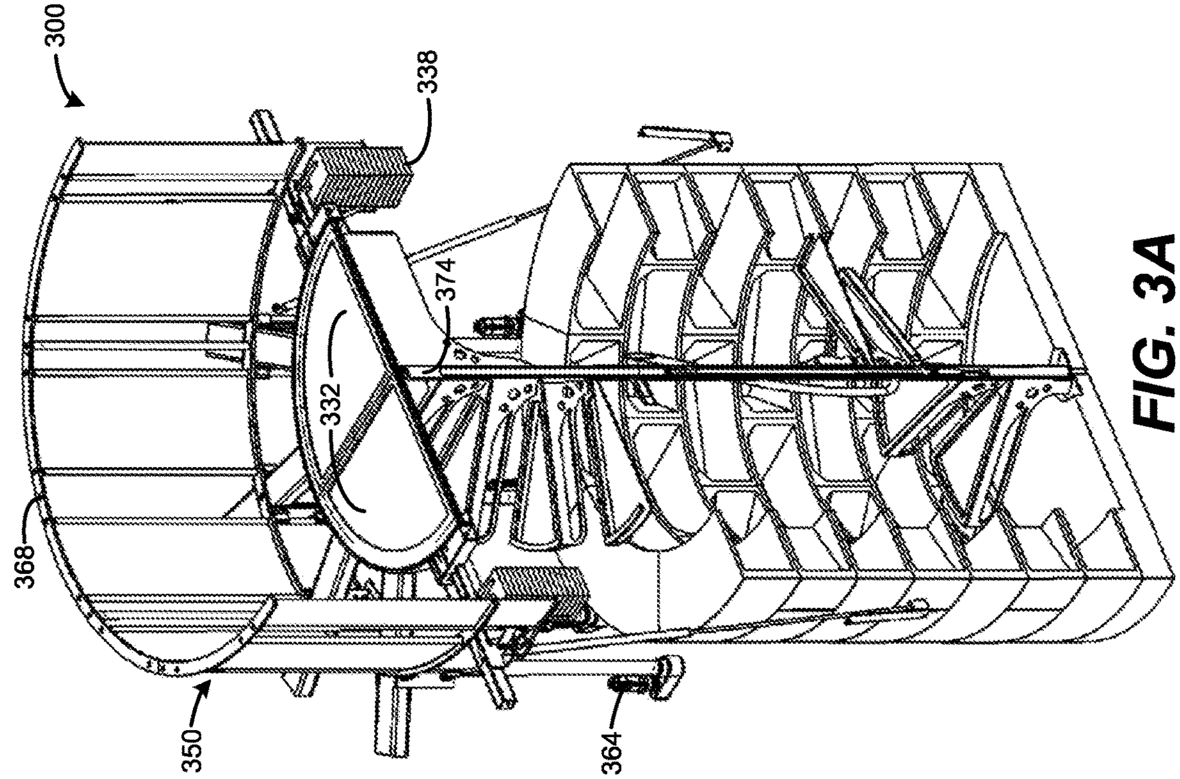
FIG. 3A is a perspective cross-section view of the system including the opening assembly in a closed configuration, the guard assembly in a deployed configuration, and the access assembly in a retracted configuration according to an example.
Figure 3B:
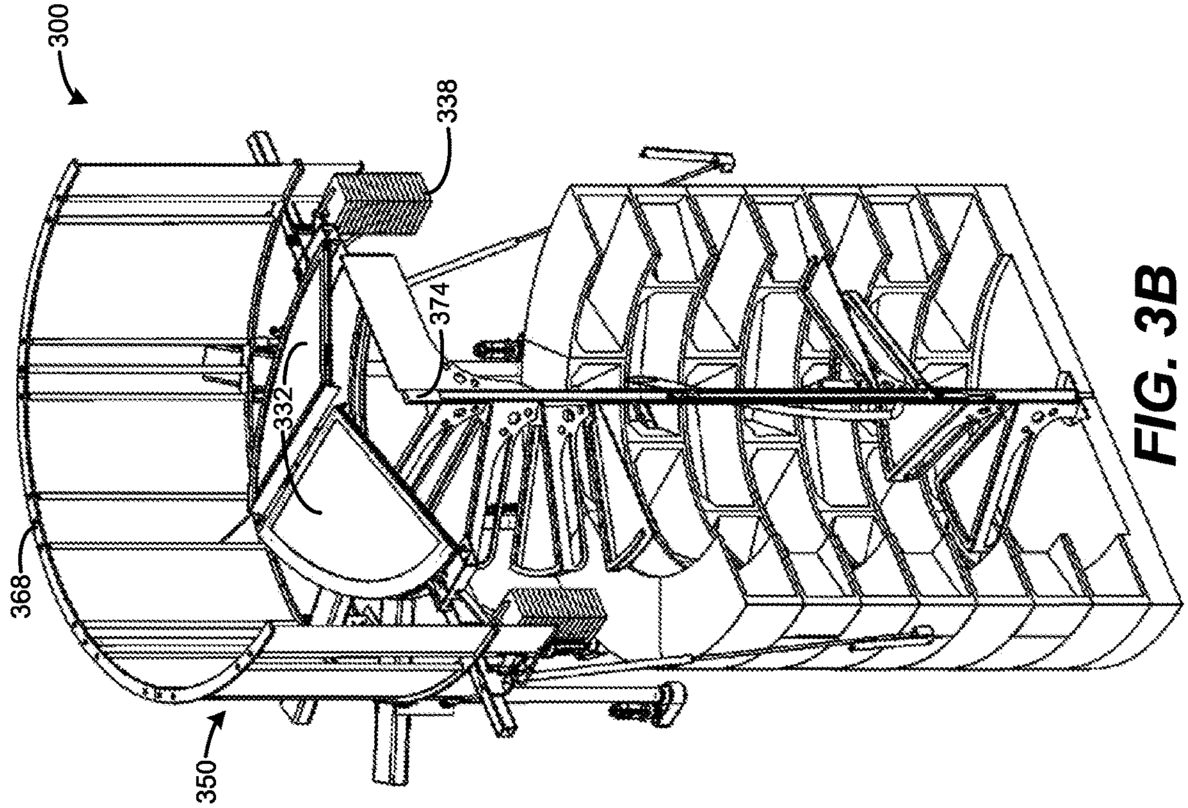
FIG. 3B is a perspective cross-section view of the system including the opening assembly in a partially open configuration, the guard assembly in the deployed configuration, and the access assembly in the retracted configuration according to an example.

FIG. 3A is a perspective cross-section view of the system 200 of FIG. 2, now referred to as system 300 in FIGS. 3A-3D, including the opening assembly with doors 332 in a closed configuration and counterweights 338 in an upper position, the guard assembly 350 with guardrail and gate 368 in a deployed configuration, and the access assembly including a post 374 in a retracted configuration according to an example. Even in the upper position, the counterweights 338 still fall within an inside of the guard assembly 350.

Figure 13:
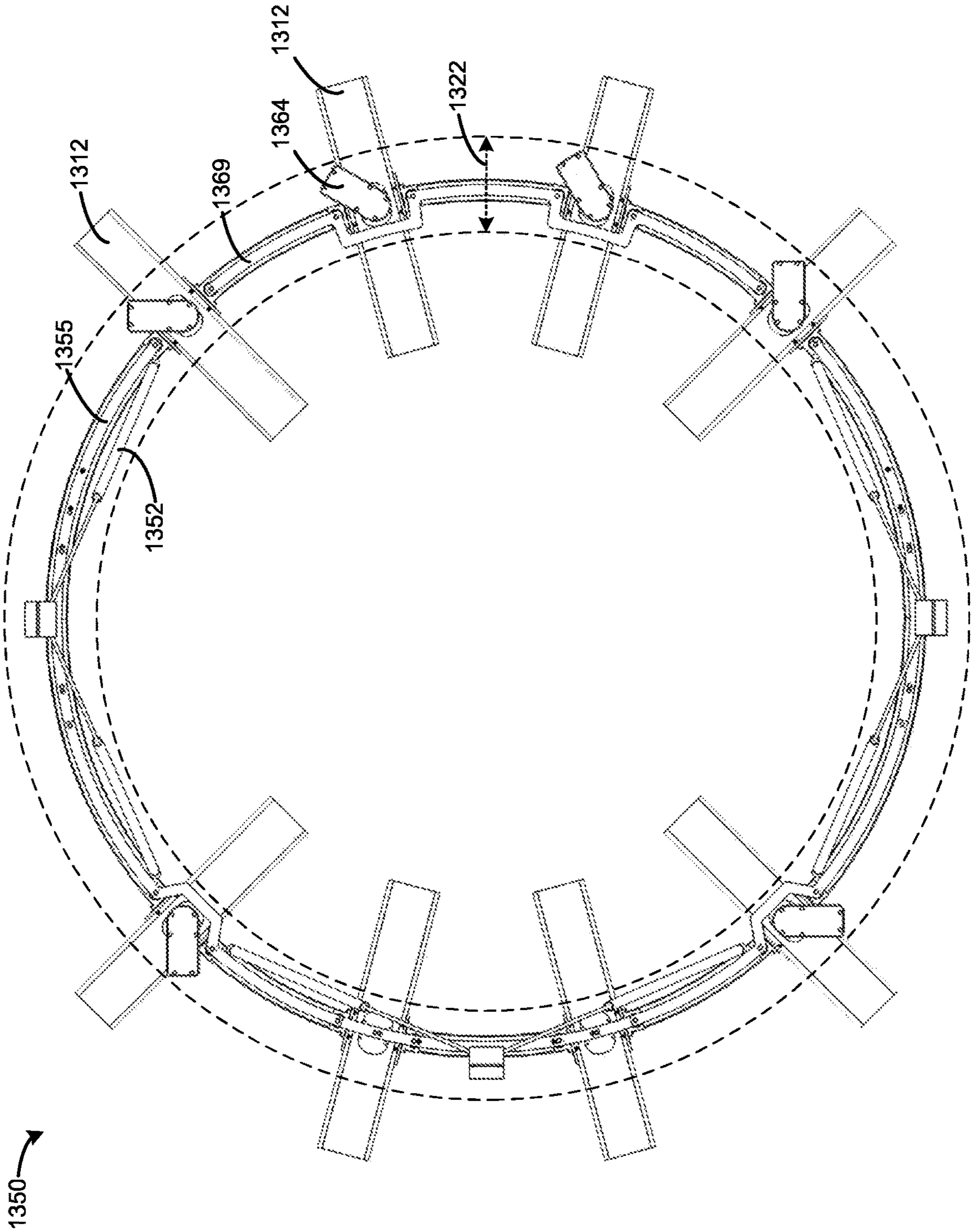
FIG. 13 is a bottom view of a guard assembly including guard actuators positioned beneath a support gap according to an example.

The guard assembly 350 is shown deployed, based on guard actuators 364. In an example embodiment, the guard assembly 350 includes six guard actuators 364, with four actuators evenly distributed around a circumference of the guard assembly 350, and two actuators designated for actuating the gate 368 of the guard assembly 350 (e.g., see FIG. 13 illustrating two gate actuators in the right-most positions, along with four remaining guardrail actuators, for six total actuators). In other embodiments, fewer or greater numbers of actuators are used, as appropriate for given design parameters such as guardrail deployment speed, guardrail weight, and desired feedback sensitivity. In the illustrated example embodiment the guard assembly weighs approximately 800 pounds, with the guardrail comprising 600 pounds and the gate comprising 200 pounds. Such a weight is suitable for the illustrated configuration of actuators, each having a range of torque suitable for lifting approximately 200 pounds.

The guard assembly 350 is shown fully deployed, with the doors 332 fully closed and post 374 fully retracted. In alternate example embodiments, the actuation of various components is at least partially simultaneous. For example, the doors 332 can partially begin opening, and/or post 374 can partially begin deploying, prior to the full deployment of the guard assembly 350. Such a scenario can enable system 300 to meet guidelines while taking advantage of simultaneous actuations to reduce overall deployment time. For example, a guideline that requires a 36" guardrail height to be in place before the door opens, is met by a system having a 42" guardrail height which is deployed and the doors begin opening and the post 374 begins deploying, once the guardrail reaches a 36" partially-deployed height, with the systems continuing to open and deploy while the guardrail finishes deploying to the full 42" height.

FIG. 3B is a perspective cross-section view of the system 300 including the opening assembly with doors 332 in a partially open configuration and counterweights 338 in a partially lowered position, the guard assembly 350 including gate 368 in the deployed configuration, and the access assembly including post 374 in the retracted configuration according to an example.

As illustrated, the post 374 is fully retracted. Accordingly, there is space above the post 374 beneath the partially opened doors 332 in which the post 374 can deploy. In other embodiments, actuation of the post 374 is synchronized to deploy with opening of the doors 332. In yet other embodiments, actuation of the doors 332 can be aided by actuation of the post 374, which provides a push to the underside of the doors 332. In various embodiments, the post 374 is spring loaded, to accommodate variations in deployment rates in the pushing between the doors 332 and the post 374, as well as to provide a cushioning effect in closing the doors 332.

Figure 3D:
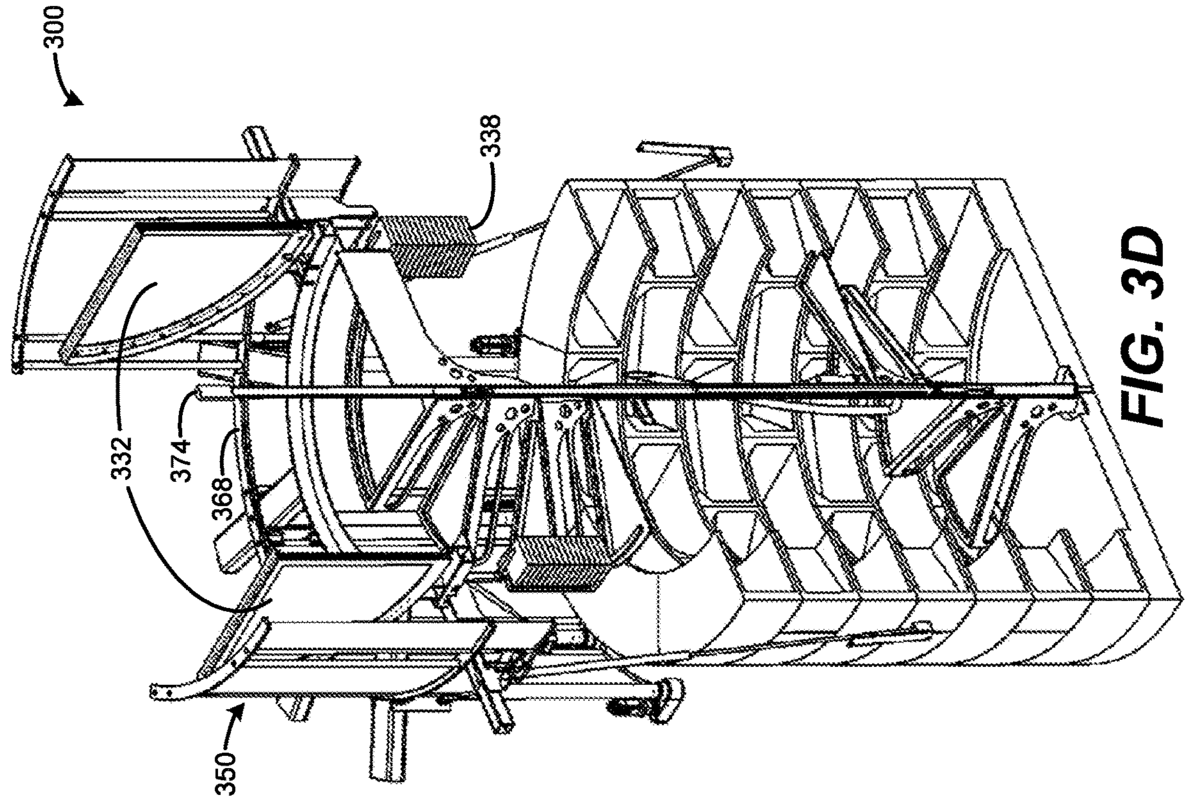
FIG. 3D is a perspective cross-section view of the system including the opening assembly in the open configuration, the guard assembly in a deployed configuration including a gate in a retracted configuration, and the access assembly in the extended configuration according to an example.
Figure 3C:
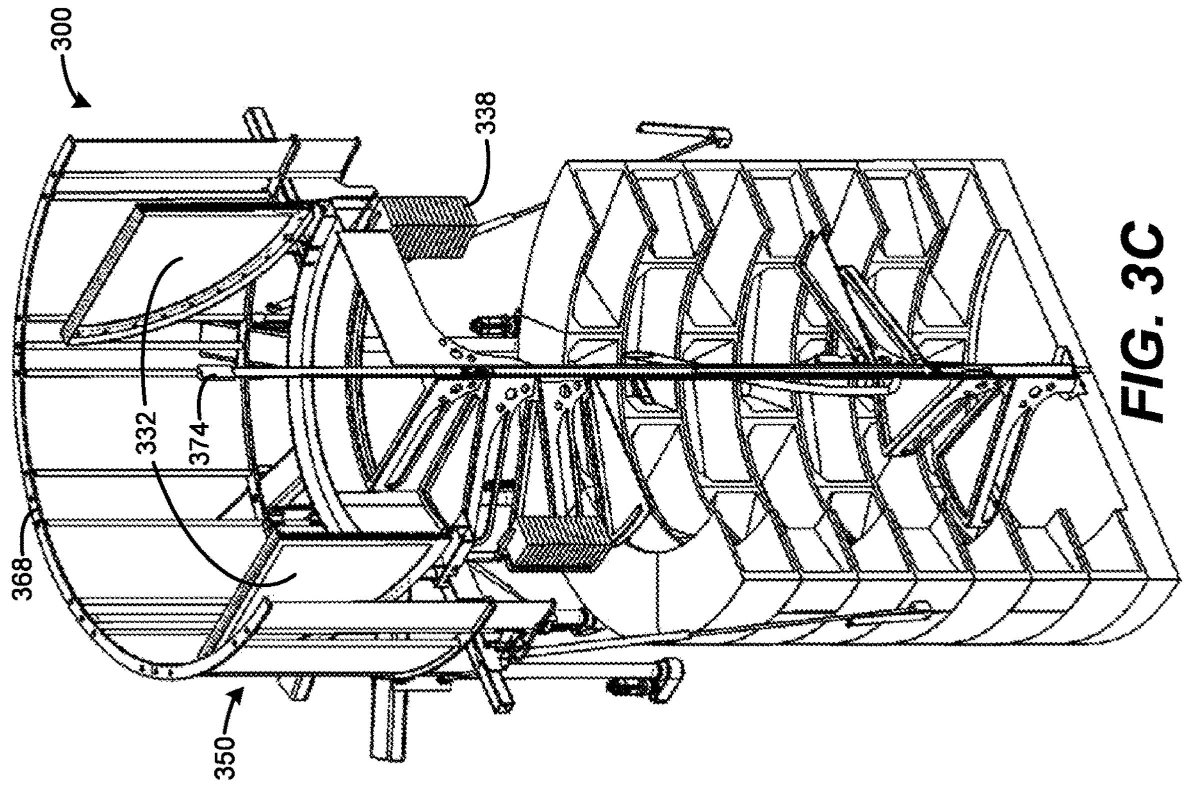
FIG. 3C is a perspective cross-section view of the system including the opening assembly in an open configuration, the guard assembly in the deployed configuration, and the access assembly in an extended configuration according to an example.

FIG. 3C is a perspective cross-section view of the system 300 including the opening assembly with doors 332 in an open configuration, the guard assembly 350 in the deployed configuration, and the access assembly including post 374 in an extended configuration according to an example. The counterweights 338 are in a fully lowered position, but do not intrude into an ingress and egress pathway of the access assembly. The doors 332 in the fully open position similarly do not intrude into the ingress and egress pathway, and allow fully unimpeded access to the gate 368 of the guard assembly 350.

FIG. 3D is a perspective cross-section view of the system 300 including doors 332 of the opening assembly in the open configuration, the guard assembly 350 including a guardrail in a deployed configuration and a gate 368 in a retracted configuration, and the access assembly including post 374 in the extended configuration according to an example.

With the gate 368 retracted, the direct path over the gate to the staircase is unimpeded, allowing users to easily and safely access the landing of the staircase.

In example embodiments, the guard assembly 350 includes an interlock between the gate and the guardrail of the guard assembly 350. The guardrail is actuatable independent of the gate 364, doors 332, and post 374, even while the gate 368 is retracted. An example guard assembly 368 includes a catch, to stop the gate 368 from raising above the guardrail, whether the guardrail is partially or fully deployed. In some embodiments, a control system for system 300 can be configured to adjust rates of deployment between the guardrail and the gate 368 of the guard assembly 350. For example, the guardrail can begin a deployment at a first rate, while the gate 368 waits in a retracted position. Once the guardrail reaches a partial deployment (e.g., when the guardrail is at one-third or one-half of full deployment), then the gate deploys at a second, faster rate to catch up with the guardrail, such that the gate and guardrail reach full deployment approximately simultaneously. The rates of deployment and retraction for the guardrail and gate can be adjusted. For example, the guardrail can deploy at a rate of 2.5 inches per second, and the gate can deploy at a rate of 3.0 inches per second. The actuation rates also can be based on varying rates of acceleration. Similar variations can be applied to all forms of actuation, using a programmable control system to direct operation of the actuators.

Various features of the system 300 remain safe during all modes of operation, and even in a power outage the system 300 operates according to redundant failsafes. For example, the various actuators are set with a thread pitch that, when power is lost, provide enough friction to lock the actuated assembly in place. Thus, for example, the post 374 remains friction locked in place by the actuator thread pitch, and resists a downward force exceeding the weight of a person, without moving.

Figure 4:
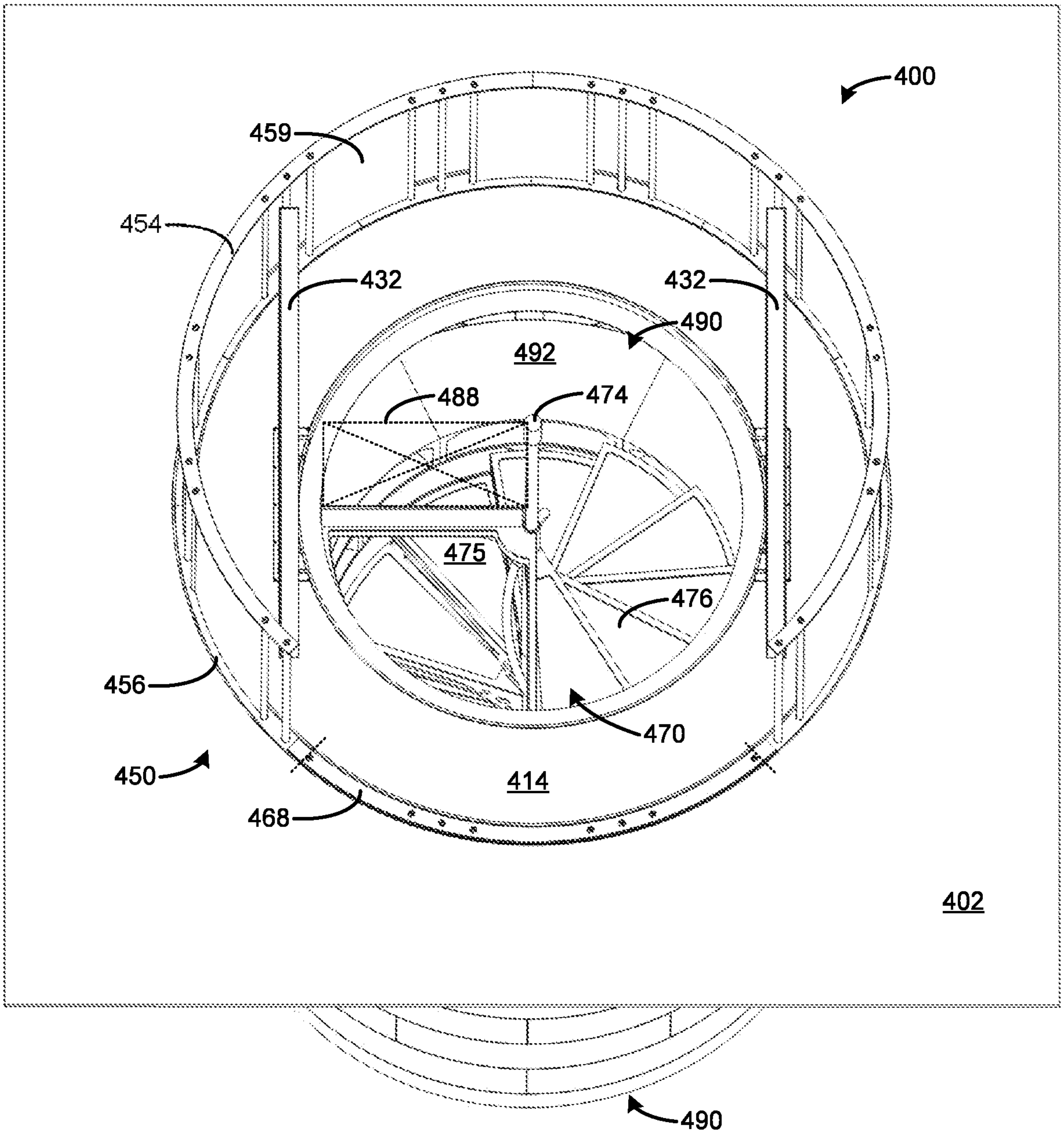
FIG. 4 is a perspective view of a system installed in a floor and including an opening assembly in an open configuration, a guard assembly in a deployed configuration including a gate in a retracted configuration, and the access assembly in an extended configuration according to an example.

FIG. 4 is a perspective view of a system 400 installed in a floor 402 and including an opening assembly with doors 432 in an open configuration, a guard assembly 450 including a guardrail 454 in a deployed configuration and a gate 468 in a retracted configuration, and the access assembly including post 474 in an extended configuration according to an example. Wall accessories 492 of the storage assembly 490 are visible, surrounding but not touching the steps 476 and landing 475 of the access assembly 470. A support pan 414 is positioned between an outer support corresponding to the guard assembly 450, and an inner support corresponding to an outline of the doors 432.

The guard assembly 450 includes shafts and guard panels 459, to provide safety protection. In an example, the guard assembly 450 can prevent the passage of a four-inch sphere (approximating the head size of an infant human). In an example embodiment, the guard assembly 450 includes a momentary guard control switch (whose position can be intentionally hidden from public view, in a secret location known only by the owner and kept secret from guests), which operates as a dead man's switch and is activated and held down to lower the gate 468. In other embodiments, the guard control switch includes a plurality of switches that are actuated simultaneously to cause the gate 468 to become actuated.

In the retracted position, the guard rail 454, doors 432, and gate 468 are flush with the finished floor 402. The various actuated assemblies are friction locked in place by actuator thread pitch, such that the assemblies do not move uncontrollably in the event of power loss, and sustain sufficient forces to serve as secure and safe hand-holds.

As set forth above, the opening assembly includes an inner support and an outer support, which can be ring-shaped as illustrated in FIG. 4. The support pan 414 provides a recessed area between the inner and outer supports of the opening assembly, which drops down. The support pan 414 is disposed above the support gap 222 (see FIG. 2), and is structure to accept finished flooring above the support gap. In an example, the support pan 414 has a depth of 1¼ inches, to accept tile, wood flooring, or other finished flooring, e.g., to match surrounding floor 402 and maintain a flush finished surface throughout system 400. The support pan 414 can include stiffening reinforcements, e.g., structured to prevent flexure when supporting the weight of a crowd of people.

In example embodiments, the guard assembly 450 includes a seal 456 disposed atop the outer support, beneath the upper guard support of the guardrail and gate, such that the seal 456 is engaged and sandwiched when the guard assembly is in the retracted configuration, to provide a seal 456 preventing fluid intrusion through the guard assembly (e.g., a liquid spill onto the floor 402). In example embodiments, the seal 456 is provided as a flexible and resilient rubber, such as neoprene or other gasket materials. The seal 456 can be provided in sections, such as two separate O-rings having slightly different diameters, to fit along an outer diameter and an inner diameter of the outer support ring. In another example, the seal 456 is provided in separate sections along the circumference of the outer support. The seal 456 prevents spilled fluids from passing through slots and holes in the outer support, which allow passage of the guardrail 454 and gate 468 through the seal 456 and the outer support.

As illustrated, an edge of the guardrail 454 is flush with an edge of the upper support rail of the gate 468, e.g., when the rails are deployed and/or retracted at the same height, or when the edges pass each other during actuation at different times and/or rates. Accordingly, a rail gap is minimized between the rail of the gate 468 and the guardrail 454, providing a continuous circular appearance when the guardrail 454 and the gate 468 a configured to cause their rails to be coplanar. In embodiments, the guardrail 454 and/or the rail of the gate 468 are made of rigid material to provide support. In other example embodiments, at least a portion of the guardrail 454 and/or the rail of the gate 468 is flexible. For example, a primary middle section of the upper rail of the gate 468 can be made of metal, and the left and/or right edges of the metal are shortened (relative to the illustrated example) to provide an approximately one-inch gap on either side of the upper rail of the gate 468, between the gate 468 and the guardrail 454, to avoid presenting a pinch-point between rail edges. The side edges of the upper rail of the gate 468, and/or the guardrail 454, can be fashioned to accommodate a break-away section (illustrated using dashed lines across the gate) that is removably fastened, e.g., via drilled holes and dowels, dovetails, mortise and tenon or other joints, to the rail(s). For example, the break-away section is fashioned of a flexible material such as rubber, plastic, or other material that appears visually similar to the rail(s), but is deformable and capable of mitigating pinch points. Accordingly, if an obstruction is introduced between the rails, the break-away section is configured to pop off and prevent damage to the obstruction, and is configured to repeatedly and easily be pushed back into place to secure the break-away section(s) to the rail(s) and complete the continuity between the rails of the gate and guardrail. In other examples, the break-away section is flexible to deform, and permanently fastened to either or both of the rails, to deform in the presence of an obstruction without damaging the obstruction and without popping off. In other example embodiments, the rails are entirely constructed of a flexible material.

In example embodiments, the edges of the guardrail 454 and the upper rail of the gate 468 can overlap and engage with each other. For example, the gate 468 can be configured to not exceed a height of the guardrail 454. Accordingly, an edge(s) the guardrail 454 can include an overhang, and/or the gate 468 can include an underhang, which provides a lateral overlap in the rails that enables the rails to positively engage each other to form a unified rail structure between the guardrail 454 and the upper rail of the gate 468. Such overlapping sections can include engagement structures to unify the rails, such as various joints, pins, or other couplings between rails.

Figure 5:
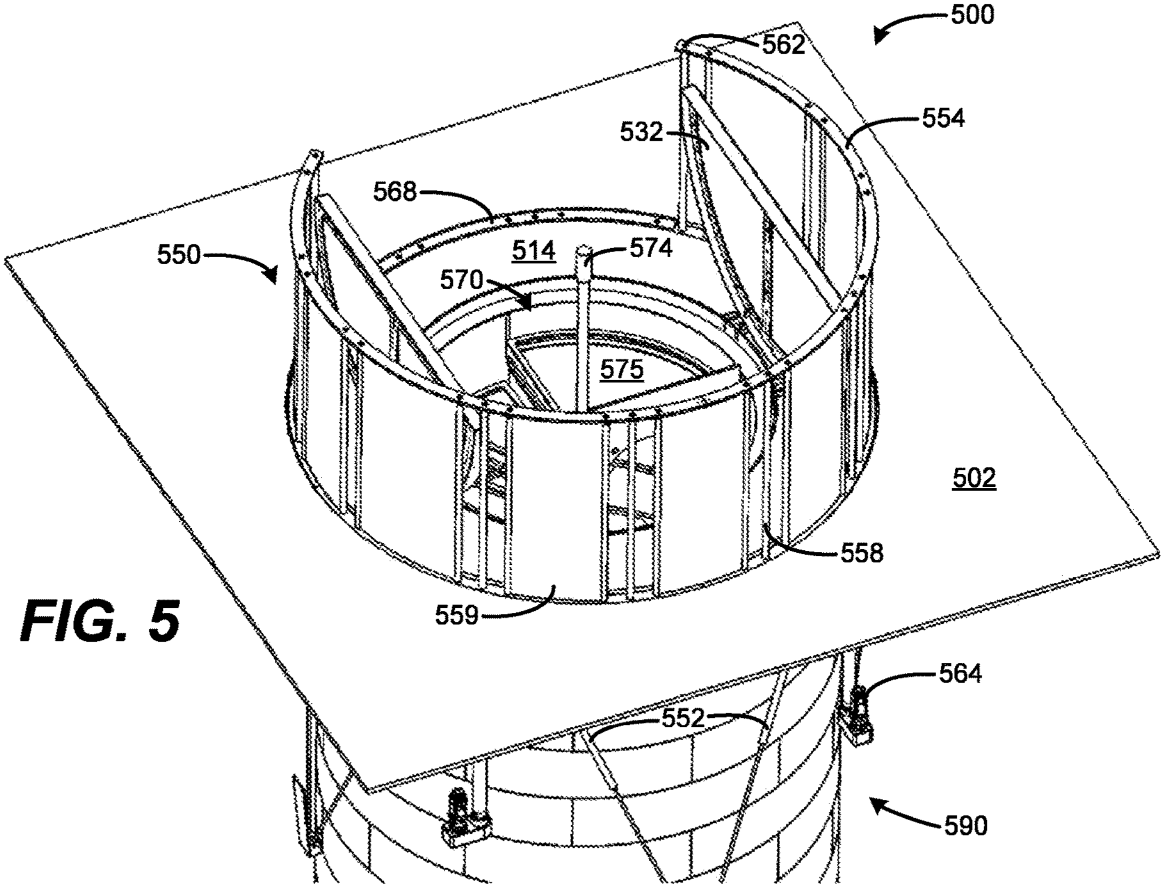
FIG. 5 is a perspective view of a system including a guard assembly in a deployed configuration including a guard control switch according to an example.

FIG. 5 is a perspective view of a system 500 including a guard assembly 550 in a deployed configuration including a guard control switch 562 disposed in a guardrail 554 according to an example. The landing 575 of the access assembly 570 is accessible by passing over the retracted gate 568 and support pan 514. Shafts 558 and guard panels 559 of the guard assembly 550 are also visible with the guard assembly 550 in the illustrated deployed configuration above the floor 502.

The guard control switch 562 can serve as a "dead man's" switch, e.g., positioned on the guard assembly 550. As illustrated, the guard control switch 562 is visible on an upper surface of the guardrails 554. In an example embodiment, the guard control switch 562 is disguised, e.g., located on an underside of the guardrail 554, has the appearance of a portion of the guardrail 554, and/or has the appearance of a fastener such as a screw or bolt like those used to construct the guard assembly 550. In other example, the guard control switch 562 includes a safety lock, and/or is hidden from view, or otherwise not readily apparent to passersby. In other embodiments, the guard control switch 562 uses fingerprint or code recognition, to prevent unwanted operation. Such safety and control features also can be integrated with a central control system as described herein.

The guard control switch 562 is configured to enable the gate 568 of the guard assembly 550 to be lowered. In an embodiment, the guard control switch 562 is held down to enable actuation while the guard control switch 562 is held down, such that premature release of the guard control switch 562 causes the gate 568 to raise back up. After the gate 568 lowers to the fully retracted position (as illustrated in FIG. 5) and the dead man's switch is released, the gate 568 is configured to automatically and momentarily remain lowered for a predetermined period of time, to allow the user (or multiple users, depending on configuration preferences) to cross the gate. Such timing and/or actuation control of the gate 568, and other systems, is orchestrated by a control system described below. In other embodiments, timing and actuation control is provided automatically, e.g., by mechanical and/or electronic controls dispersed throughout the system 500 (e.g., the gate 568, and other systems, can include its own momentary timer and actuation control, separate from or in addition to a central control system). After the predetermined period of time for crossing the gate 568 passes, the gate 568 automatically returns to the deployed position.

In other embodiments, the system 500 includes a remotely mounted sensor, e.g., a proximity sensor with configurable recognition, can be used to detect obstructions near the system 500. For example, a far wall (not shown) adjacent the system 500 can mount a proximity sensor, which is configured to recognize a given (obstruction-free) configuration of the system 500, such as the illustrated "open" configuration in FIG. 5, and the "closed" configuration shown in FIG. 2. Accordingly, a control system of system 500 can consult the proximity sensor before opening the doors, to confirm that the proximity sensor indicates that the obstruction-free "closed" configuration is present, before proceeding to open the doors. Similarly, before closing the doors and retracting the various assemblies, the system 500 can consult the proximity sensor to confirm that the obstruction-free "open" configuration is present, before proceeding to close the doors. Various proximity sensors provide various sensitivities and resolutions, to accommodate given installations, features of the system 500, and distances between the proximity sensor and the system 500, with sufficient distinction to discern between system components and undesired obstructions.

Figure 6:
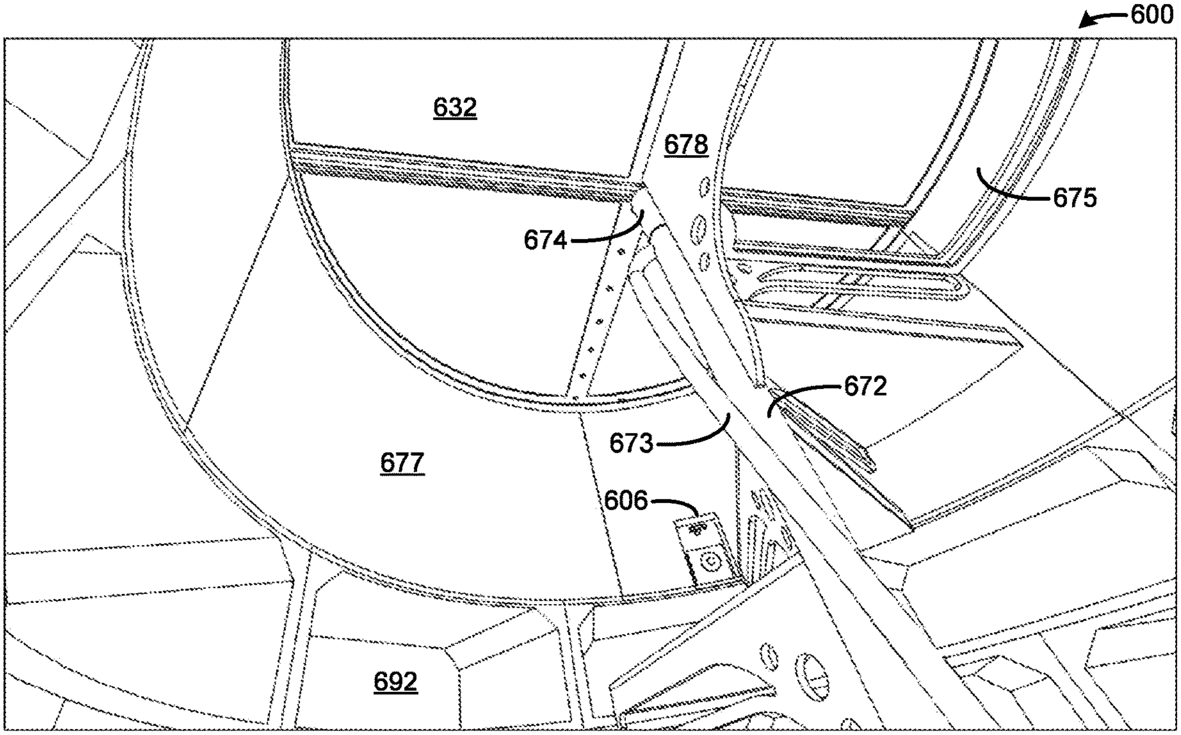
FIG. 6 is a perspective view of an inside of a system including an opening assembly in a closed configuration including a manual release and a power control switch according to an example.

FIG. 6 is a perspective view of an inside of a system 600 including an opening assembly with doors 632 in a closed configuration including a manual release and a power control switch 606 according to an example. A post 674 of a staircase access assembly is visible in a retracted position underneath the doors 632, along with other components of the staircase such as landing 675, webbing 678 of the landing 675, central support 672, and handrail 673. A cylindrical cover 677 is installed to enclose unstructured storage space behind the cover 677 between the doors 632 above and the storage assembly 692 below. The manual release and the power control switch 606 are installed at the base of the cover 677 facing toward the access assembly staircase for safe and easy actuation.

In the illustrated example embodiment, the manual release and the power control switch 606 includes an emergency release electrical button and mechanical cable pull release. Regardless of in which state of actuation the doors 632 are in, pulling the manual release 606 enables gravity to act on the counterweight(s) (not visible behind cover 677; see counterweight 238 in FIG. 2) to cause at least one door to open, depending on system configuration preferences. A benefit of the system 600 is that ingress and egress are possible even if one door remains closed. The emergency release of the door(s) 632 is activated electronically and/or manually, to enable the door(s) to open automatically by action of movement of the counterweight(s). Example embodiments also enable the emergency-released opened door(s) to be rendered mechanically inoperable, based on mechanical operation of the emergency release, to place the system in a condition for inspection and servicing before the system can be cleared for resuming normal operation (an example of rendering the open doors mechanically inoperable is described in further detail below at FIG. 9B). Other embodiments of actuated systems, such as the guard assembly and post 674, are rendered mechanically stable by electronic activation of the emergency button, which removes power from the actuators, which are mechanically geared to friction lock in place.

Figure 7:
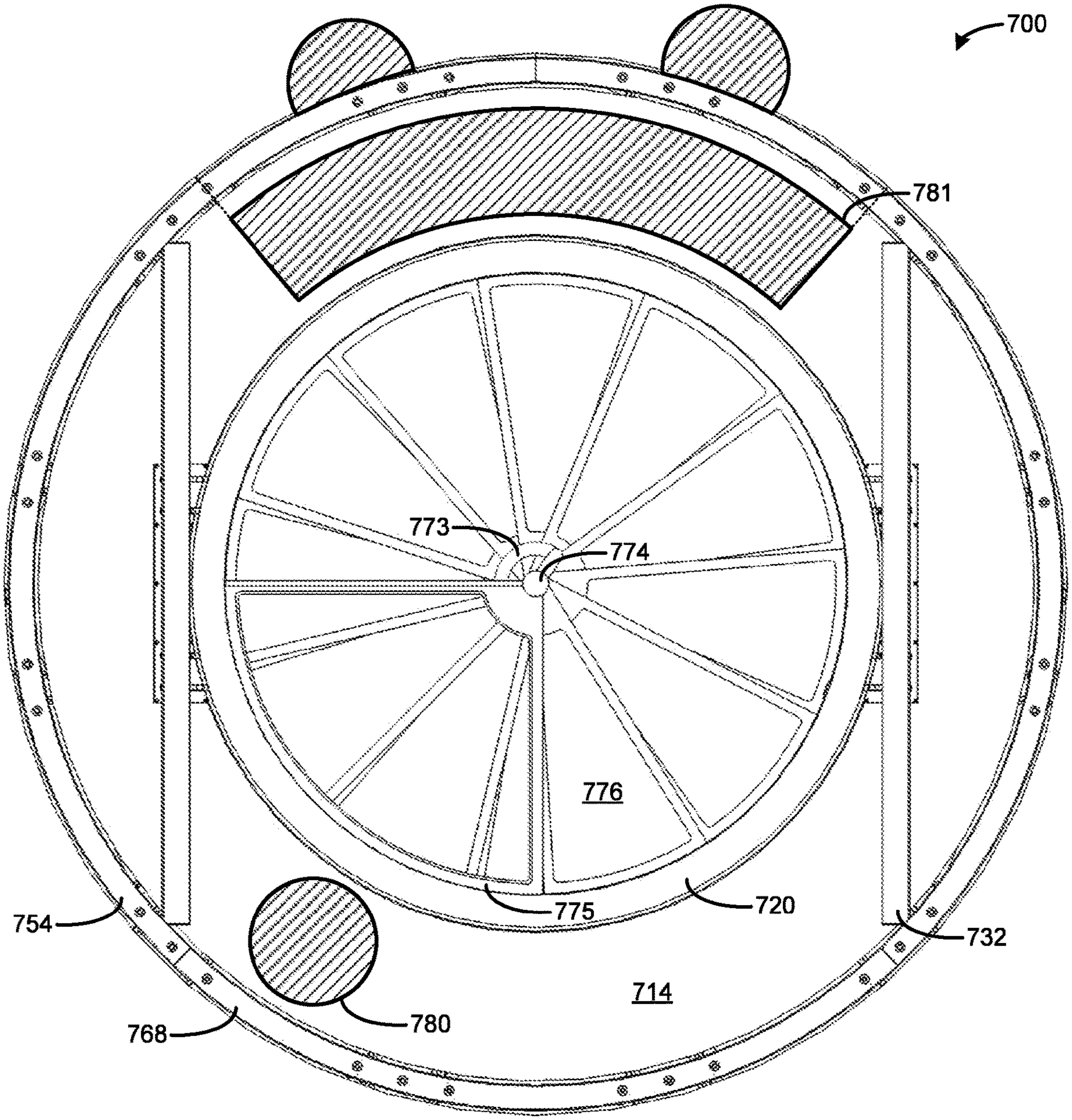
FIG. 7 is a top view of a system including a plurality of accessories and an opening assembly in an open configuration according to an example.

FIG. 7 is a top view of a system 700 including a plurality of accessories 780, 781, and an opening assembly including doors 732 in an open configuration according to an example. The landing 775, steps 776, post 774, and handrail 773 of the staircase access assembly are visible within the inner support 720 of the opening assembly. The accessories 780, 781 are disposed in the support pan 714, between the inner support 720 and the outer support located at the guardrail 754/gate 768. Although the accessories 780, 781 are shown separate from the inner and outer supports, in other embodiments, the accessories can extend into or over the inner and/or outer supports, as described in greater detail below.

The top-down view of FIG. 7 illustrates details on the generous clearance above the stairway access assembly, enabling the use of a full ninety degrees for landing 775. The landing 775 is transparent, enabling underlying steps 776 to be visible through the landing 775. The fully open space above the staircase further enables the use of spacing and configuration of the staircase to provide full head clearance without a need for awkwardly large vertical drops between steps, or other limitations (e.g., needing to remove the landing 775) that might be imposed by having only a single door with its correspondingly reduced head clearance while traversing the spiral staircase. In a specific example, the illustrated dual-door system enables vertical drops between the floor and landing, between the landing and steps, and between each step to be approximately nine inches. Accordingly, at an ingress/egress area covered by a triangle formed by side edges of the gate 768 and the post 774, the greatest cumulative vertical drop remains less than 30 inches. Such a feature enables the system 700 to remain fully compliant with example stairway safety codes. Similar benefits can be achieved with fewer or greater numbers of doors, based on the opening assembly features described herein to actuate the door to be open above the access assembly.

The illustrated accessories are actuatable between a retracted configuration and a deployed configuration. When retracted, the accessory 780, 781 is retracted at least partially into the support pan 714 of the opening assembly. Accordingly, the accessory 780, 781 is exposed to air beneath the floor, which can be conditioned or kept at a different temperature than above floor. In the deployed configuration, the accessory 780, 781 is at least partially accessible above the support pan 714 of the opening assembly. Accordingly, a user does not need to open or enter the system 700 to access the accessory, and can simply actuate the accessory 780, 781 for access while the doors 732 and guard 754/gate 768 remain closed/retracted.

The accessories 780, 781 are shown disposed between an outer support and an inner support 720 of the opening assembly. Accessories 780, 781 are shown as a cylindrical device and an annular shelf, which are independently deployable from the finished floor inlaid between the inner support 720 of the doors 732, and the outer support of the opening assembly. The accessories 780, 781 are configured to rise approximately four feet above floor level, and can be used for wine bottles, glass wear, or other features (e.g., provide a beverage dispenser to dispense cooled beverages stored within the wine cellar). The accessories 780, 781 thus provide easy access to contents of the underlying enclosed space/cellar, without needing to open the door(s) 732.

The accessory 780 is compact enough to fit between radial support arms 212 of the opening assembly (see FIG. 2). The accessory 781, in contrast, comprises an arc that would span across multiple support arms 212, which is compatible with an embodiment of the opening assembly having support arms configured to accommodate such an accessory. For example, the inner support 720 is provided with additional reinforcement, to eliminate a need for various ones of the side support arms corresponding to the location of accessory 781, by supporting the reinforced inner support 720 ring via reinforced support arms located at the door hinge areas (see, e.g., support arms 812 of FIG. 8A). Thus, the accessory 781 is retractable under the support pan 714 without risk of interference from support arms of the opening assembly, or needing to dimension the accessory 781 to fit between the lateral spacing of the support arms.

In other embodiments, the accessories 780, 781 are coupled to the handrail 754. For example, at least a portion of the handrail can be extended radially inward (as shown represented by dashed lines), to provide the floor accessory (e.g., as a shelf). Accordingly, the extended section of the handrail also serves as a floor accessory that actuates with the guardrail 754. The accessory 781 can be configured to provide storage that is accessible from outside the outer diameter of the guardrail 754 (e.g., by providing shelving that faces outward, and/or inward). In other examples, the accessory 781 extends radially outward from the guardrail 754. In other embodiments, the accessory 780 is actuatable to be at least partially accessible above the support pan 714 of the opening assembly, and is configured to dispense a fluid, e.g., as a beverage dispenser.

The accessories 780, 781 in other example embodiments can provide various functionality, such as tables, wet bars (including sinks, ice makers, full hookups for water/electrical/etc., that actuate with their accessory), chairs, and the like. In an example embodiment, two wet bars are provided in the shapes of accessory 781, positioned across from each other at the upper and lower quadrants of system 700, with two gates 768 positioned across from each other at the left and right quadrants of system 700. Accordingly, the wet bar accessories 781 in this configuration, when deployed, serve as physical barriers, with the barrier extending seamlessly between the bars and the adjoining upper rails of the two gates. Another ring of actuated assemblies can be extended around the illustrated rings of FIG. 7, to provide seat accessories (such as accessory 780) outside of the bar accessories. In other embodiments, seats can be integrated into the guard assembly. Thus, this type of embodiment is suitable for the dance floor of a night club, or other venue, whereby a full wet bar can spontaneously emerge from the dance floor, with full access to the cellar for additional storage, and seating for patrons dispersed around the bar for patrons. Other configurations of system 700 are contemplated, such as non-circular configurations (square, horseshoe, etc.) with varying gate locations. For example, a horseshoe-shaped wet bar actuatable accessory can include a gate spanning across the ends of the horseshoe accessory.

The example embodiment of FIG. 7 illustrates guardrail 754 occupying approximately ¾ of a circumference of the guard assembly, and the gate 768 occupying approximately ¼ of a circumference of the guard assembly. In other example embodiments, the guard assembly can be comprised of a plurality of gates, which can be an arbitrary subsection of the total circumference (or an arbitrary subsection of the corresponding total structure in non-circular embodiments). For example, the guard assembly can be comprised of 16 independently actuatable gates, each comprising 1/16 of the circumference of the guard assembly. Such gates can be controlled by the system 700 in aesthetically pleasing patterns, such as actuating the gates in a rolling wave traversing the circumference, or various other patterns, in addition to simultaneous actuations. Furthermore, multiple gates can be actuated to form combined patterns. For example, five gates can be actuated together to form one large gate occupying 5/16 of the guard assembly circumference. A given gate can include one or more shafts and one or more actuators, and is actuatable without risk of binding based on the various approaches described herein (including break-away sections of the gate railings).

In an example embodiment, the doors 732 in the open configuration mechanically prevent the guard assembly from retracting, ensuring that the guard assembly remains safely deployed. For example, the doors 732 are opened to position the ends of the doors 732 laterally extending beneath the deployed guard assembly. Accordingly, the guardrail 754 is mechanically prevented from fully retracting by interference from the doors 732. In an example embodiment, the guardrail 754 is deployable to a height of 42 inches, and the doors 732 are configured to stop the guardrail 754 from retracting lower than 36 inches (e.g., to comply with a guardrail height regulation). In another example, the underside of the guardrail includes a stopper rod (not shown) extending downward toward the edges of the opened doors 732, to stop the guardrail from retracting earlier. For example, with the 42 inch guardrail height and 36 inch door edge height, the guardrail can be installed with a 6 inch stopper, such that the guardrail is prevented from any retraction movement if the doors are fully open as illustrated in FIG. 7.

Figure 8B:
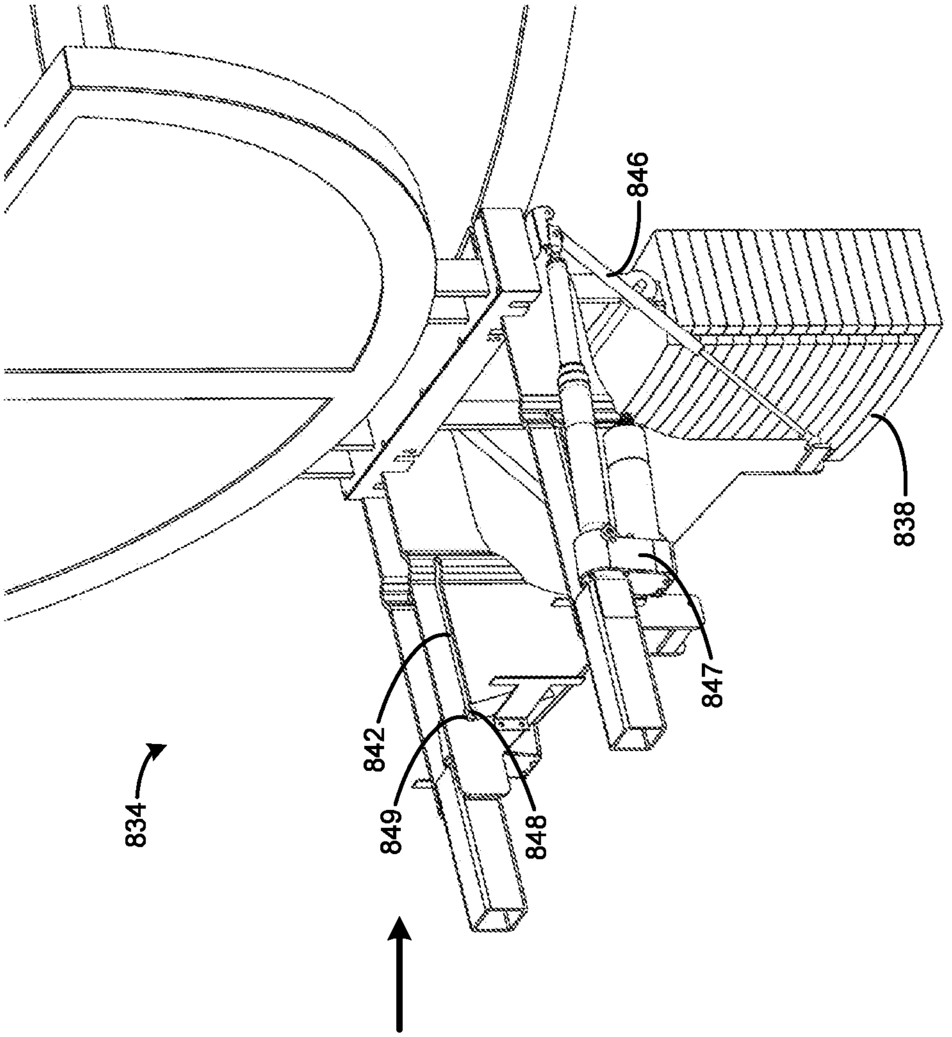
FIG. 8B is a perspective view of the door actuation system including the mount, door actuator, and counterweight in an actuated open configuration according to an example.
Figure 8A:
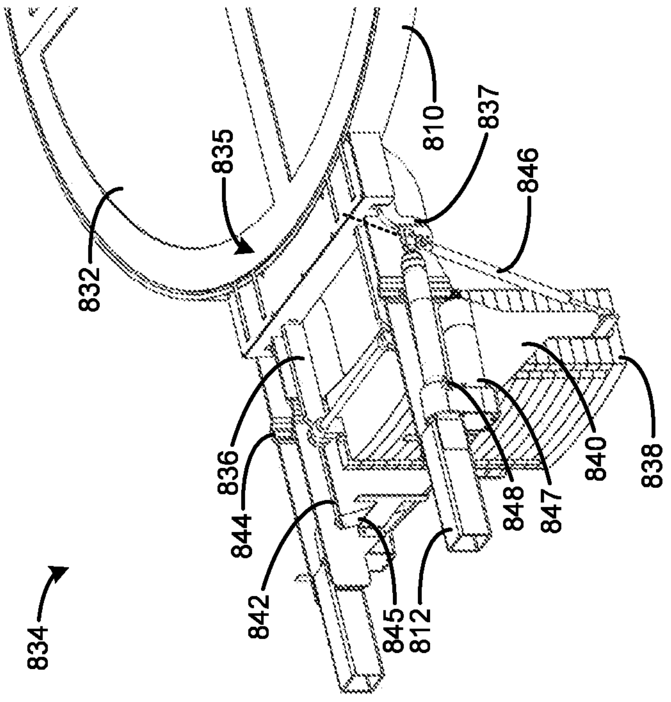
FIG. 8A is a perspective view of a door actuation system including a mount, door actuator, and counterweight in a closed configuration according to an example.

FIG. 8A is a perspective view of a door actuation system 834 including a mount 840, door actuator 847, and counterweight 838 in a closed configuration according to an example. The door 832 includes a counterweight arm 836 coupled to the counterweight 838, and an actuated arm 837 coupled the door actuator 847 and a mount gas spring 846. The mount 840 includes a release 844, which in the illustrated example is a pair of outwardly curving sections spaced to accommodate passage of a trunnion 848 of the door actuator 847 for removal of the door actuator 847. In other examples, the release 844 is formed using other structures, such as cutouts or recesses. The mount 840 also includes slots 842, dimensioned to allow the trunnion 848 to slide, but not allow the trunnion collar 849 to slide. In the illustrated example, a portion of the mount has been removed to reveal the actuator components. The mount 840 is dimensioned to accommodate the actuator between plates of the mount, and the plates serve as structural members joining the support arms 812 to the inner support 810 and hinges 835 of the door 832. Collar springs 845, illustrated as leaf springs, are used to hold the trunnion collars 849 in place.

The mount gas spring 846 is configured to provide variable opening bias to the actuated arm 837. For example, in the illustrated closed position, the actuated arm 837 is positioned to align the mount gas spring 846 with an axle of the door hinge. Accordingly, when the door 832 is in the closed configuration, the mount gas spring 846 does not bias the door 832 open or closed (in contrast to the open position shown in FIG. 8B, whereby the mount gas spring 846 is aligned offset from the hinge axle, thereby exerting an opening torque on the door). As the door 832 begins to open, the mount gas spring 846 applies an increasing opening bias to the door 832.

Figure 11:
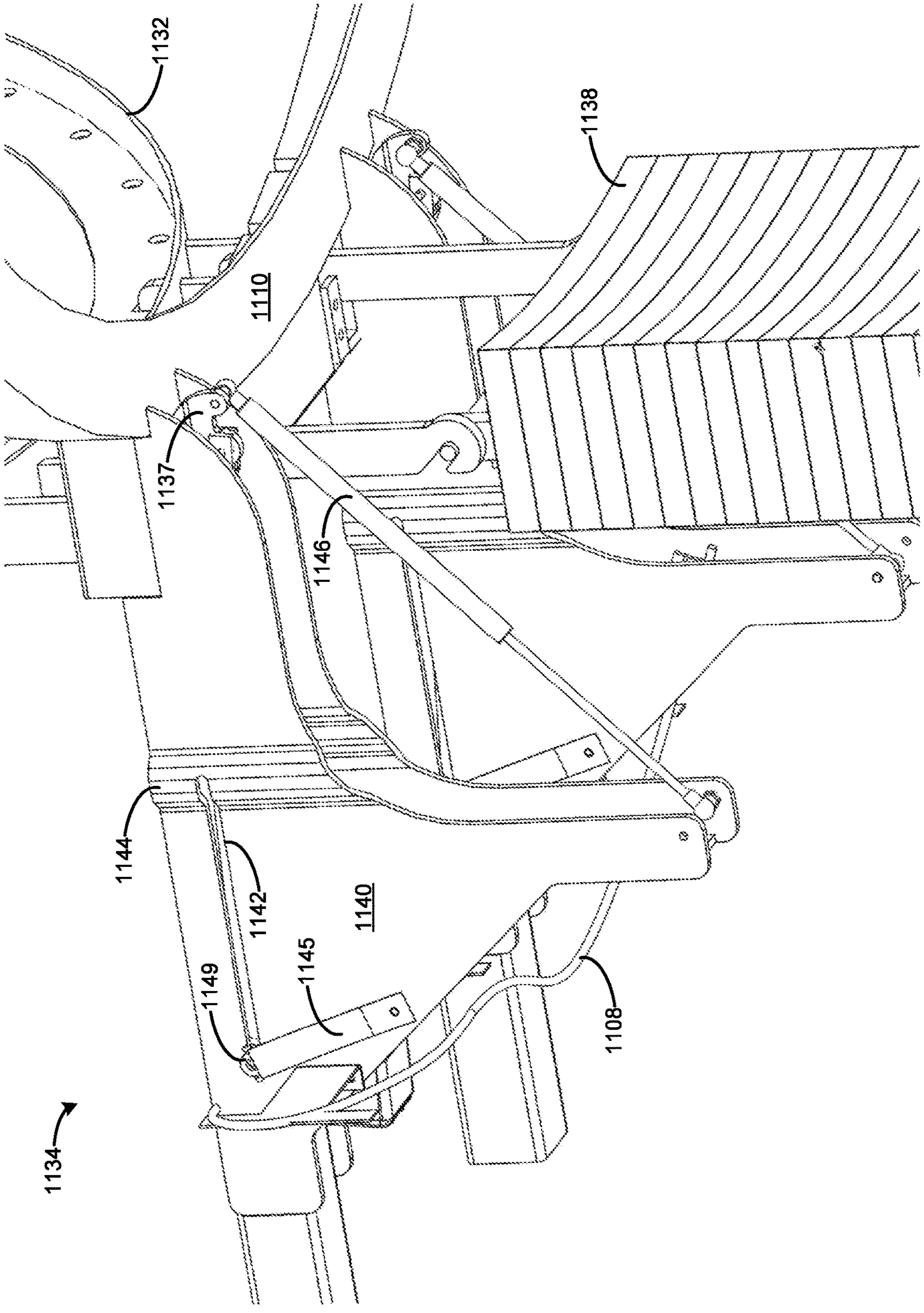
FIG. 11 is a perspective inside view of a door actuation system including a plurality of mounts and a counterweight corresponding to an open configuration according to an example.

The door actuation system 834 is configured and structured to fit within tight space constraints of the enclosed space, guard assembly, access assembly, storage assembly, and other aspects of the overall system. The counterweight 838 swings in a relatively short arc, without interfering with the guard assembly. The counterweight 838 is sculpted to conform to an area beneath the support gap. For example, the counterweight 838 is formed as an arc (e.g., see an inside arc of an embodiment of the counterweight 1138 as shown in FIG. 11). The conformal shape of the counterweight 838 enables the counterweight 838 to move very close to surrounding structures, compared to a shape of the counterweight 838 that was not conformal to surrounding structures.

The mount gas spring 846 is mounted low toward a bottom of the mount 840, to achieve an angle (indicated by dashed line) consistent with controlling the spring's torque delivery to the door 832, and consistent with enhancing the doors 832 opening fully at an aesthetically pleasing 90 degrees. The counterweight 838 is configured to balance the door 832, and the location of the hinge relative to the door 832 and sub-floor counterweight 838 (e.g., the counterweight arms 836 being offset to accommodate the hinge axis being positioned sub-floor, while the doors are above-floor), results in a slightly off-balance configuration. Accordingly, the mount gas spring 846 provides additional and adjustable bias for the balancing of the door/counterweight balance. Thus, in an example embodiment, the door/counterweight bottom-heavy balance naturally assumes an 85 degree orientation, and the mount gas spring 846 provides additional bias to achieve an example optimal angle for that embodiment of 90 degrees. In alternate embodiments, the door/counterweight system and geometry (e.g., offset from hinge angle, relative recess of the arms relative to the hinge angle and floor) can be naturally balanced for other angles, including angles of 90 degrees that do not use a gas spring to achieve that 90 degree balance. When the door is closed, the mount gas springs 846 are aligned to merely to push radially toward the axis of the door hinge (as indicated in dashed line), thereby not exerting a rotational force on the door 832. In an example embodiment, the mount gas springs 846 provide less than 135 pounds of force with the doors 832 closed, and more than 50 pounds with the doors 832 open. The springs are illustrated as gas springs, but other (e.g., coil) springs are contemplated to create a moment/torque on the door hinge shaft, to apply torque to the shaft when the doors are in the open position, coupled with the offset from the hinge shaft to enable a predetermined force suitable for the engineered geometry. The springs 846 are arranged and connected to maximize the moment/torque when in the doors 832 are in the open configuration, and not to apply that type of moment/torque when the door is in the closed position.

FIG. 8B is a perspective view of the door actuation system 834 including the mount 840, door actuator 847, and counterweight 838 in an actuated open configuration according to an example. The door actuator 847 is in an extended configuration, having pushed the actuated arm 837 inward to actuate the door 832 open. The trunnions 848 enable the actuator to pivot within the mounts 840, to accommodate lateral deflection of the end of the actuator 847 during extension. The counterweight 838 is shown balanced in the open position, by virtue of the mount gas spring 846 being aligned offset from the hinge axle to exert an opening torque on the door, offsetting the relative differences in position of the door relative to the floor and axis, versus the counterweight arms 836 relative to the floor and axis, to achieve a net balance achieving a 90 degree door open configuration.

Figure 9B:
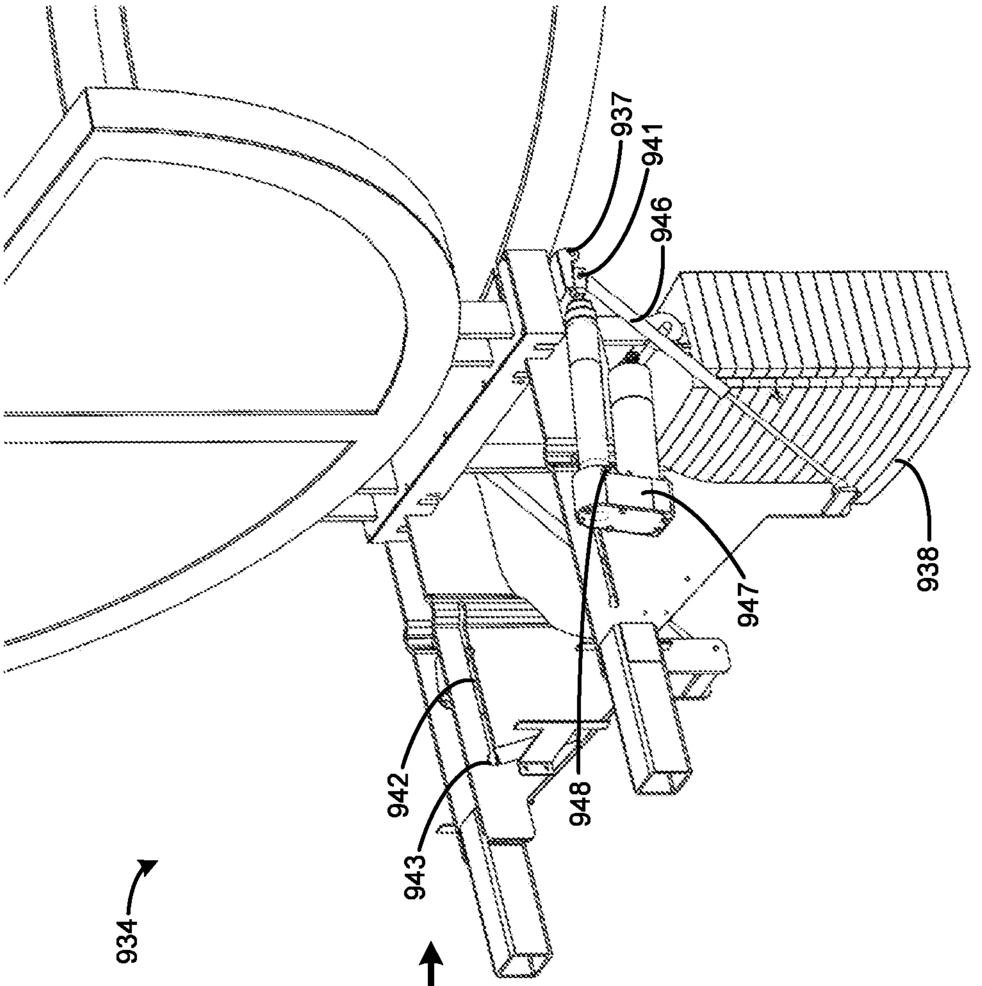
FIG. 9B is a perspective view of the door actuation system including the mount, door actuator, and counterweight in a manually released open configuration according to an example.
Figure 9A:
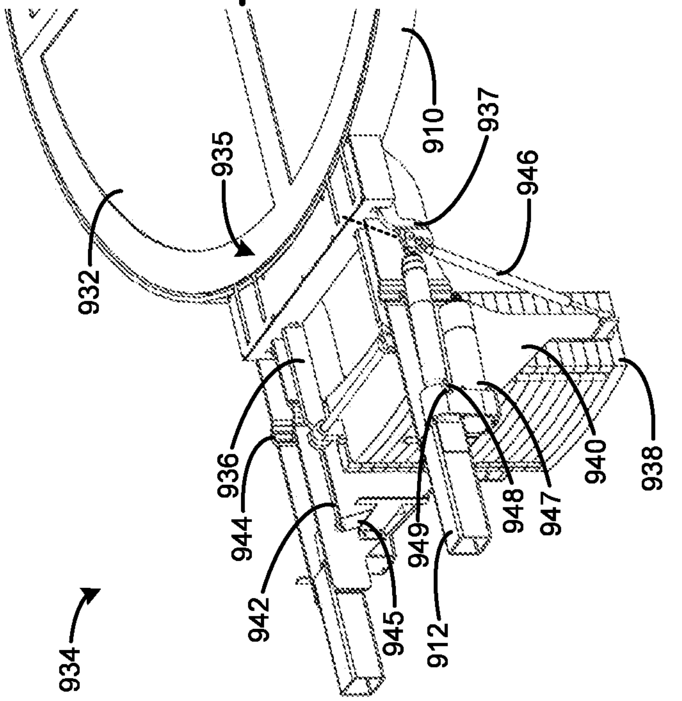
FIG. 9A is a perspective view of a door actuation system including a mount, door actuator, and counterweight in a closed configuration according to an example.

FIG. 9A is a perspective view of a door actuation system 934 including a mount 940, door actuator 947, and counterweight 938 in a closed configuration according to an example. Similar to FIG. 8A, the door actuation system 934 is shown in a closed configuration, with the door 932 and counterweight arm 936 rotated horizontally about the hinge 935. The trunnion collars 949 are installed on the trunnions 948, anchoring the trunnions 947 pivotably in place relative to the mounts 940, by virtue of the collar seats 943 formed at one end of the slots 942.

FIG. 9B is a perspective view of the door actuation system 934 including the mount 940, door actuator 947, and counterweight 938 in a manually released open configuration according to an example. In contrast to the configuration shown in FIG. 8B, the actuators 948 in FIG. 9B are fully retracted. The fully retracted configuration indicates that the manual release was pulled (removing the trunnion collars 949 from the collar seats 943) when the actuators 947 were in a retracted configuration as shown in FIG. 9A. In other examples, the actuator 947 can be release regardless of the configuration of the actuator, even when fully extended/actuated.

The trunnion 948 of the actuator 947 is secured by the trunnion collar 949 secured in an enlarged seat 943 of the slot 942 of the mount 940. The trunnion collar 949 is manually releasable to enable the trunnion 948 to slide in the slot 942 of the mount 940 by action of the door 932 passively opening via movement of the counterweight 938 and/or torque from the spring 946. The slot 942 of the mount 940 also includes trunnion release section 944 to allow the trunnions 948 of the actuator 947 to be disengaged from the slot 942 of the mount 940. For example, the pin 941 of the actuator 947 can be removed, and the actuator 947 slid further forward than the configuration illustrated in FIG. 9B, allowing the trunnions to align with the release section 944, and pulled upward and out from the mount 940. Thus, the actuators 947 can easily be removed for servicing, without a need to remove the opening assembly or perform other major teardown.

In an embodiment, the door actuators 947 include a brake on the actuator motor, which automatically engages in a power loss condition, and holds the actuator in its current position, which holds the doors 932 in their positions. Accordingly, the door actuator(s) 947 can be released (e.g., using a manual pull cable or battery-operated electronic solenoid) to allow the door(s) to open. In an embodiment, a clevis pin (see pin 941 in FIG. 9B) of the actuator is removable, e.g., via pull-cable, to release an end of the actuator from the actuated arm 937 of the door 932.

In another embodiment, the trunnion collar 949 is removable from the trunnion 948 of the actuator in order to mechanically release the door actuators 947. The trunnion collars 949 are too large to slide out of their seats 943 into the slots 942. However, removing the trunnion collar 949 (e.g., by pulling outward along an axis of the trunnion 948), enables the relatively smaller diameter of the trunnion 948 to slide in the slot 943 to position the trunnions 948 in the release section 944 for removal. The trunnion collars 949 remain in place in the seats 943 and trunnions 948 during normal operation, or during use of an electrical safety override switch to override a control system and drive the actuators. The trunnion collars 949 can be provided as bushings or bearings of suitable material (e.g., brass bushings), to facilitate pivoting of the actuators 947 about the trunnions 948. The trunnion collars 949 are manually releasable, e.g., directly via a wire/pulley arrangement connected to a manual hand pull, which is accessible from the access assembly inside the enclosed space (e.g., via manual hand pull 606 in FIG. 6). The released trunnions 948 allow the entire actuator 947 to slide along the channel formed between the plates of the mounts 940. This sliding of the freed actuator 947 permits the door 932 to open freely, even with loss of electrical power by virtue of gravity acting on the counterweight 938, and/or the spring 946 providing an opening bias, once the actuator is released. Similar operation of automatic gravity-driven door opening is achieved in other embodiments, with release of the clevis pin 941, without causing sliding movement of the actuators 947. Collar springs 945, illustrated as leaf springs, are used to hold the trunnion collars 949 in place. The manual release pull-cable overcomes the leaf springs and removes the trunnion collars 949. A standoff bracket is shown disposed next to the collar spring 945, to standoff the pull cable (not shown in FIG. 9A or 9B; see cable pull 1008 in FIGS. 10A and 10B). The trunnion collars 949 include multiple diameters, and a chamfer on at least one end. The pull cables are passed through drilled holes in the trunnion collars and crimped to secure the cable to the trunnion collar.

Figure 10A:
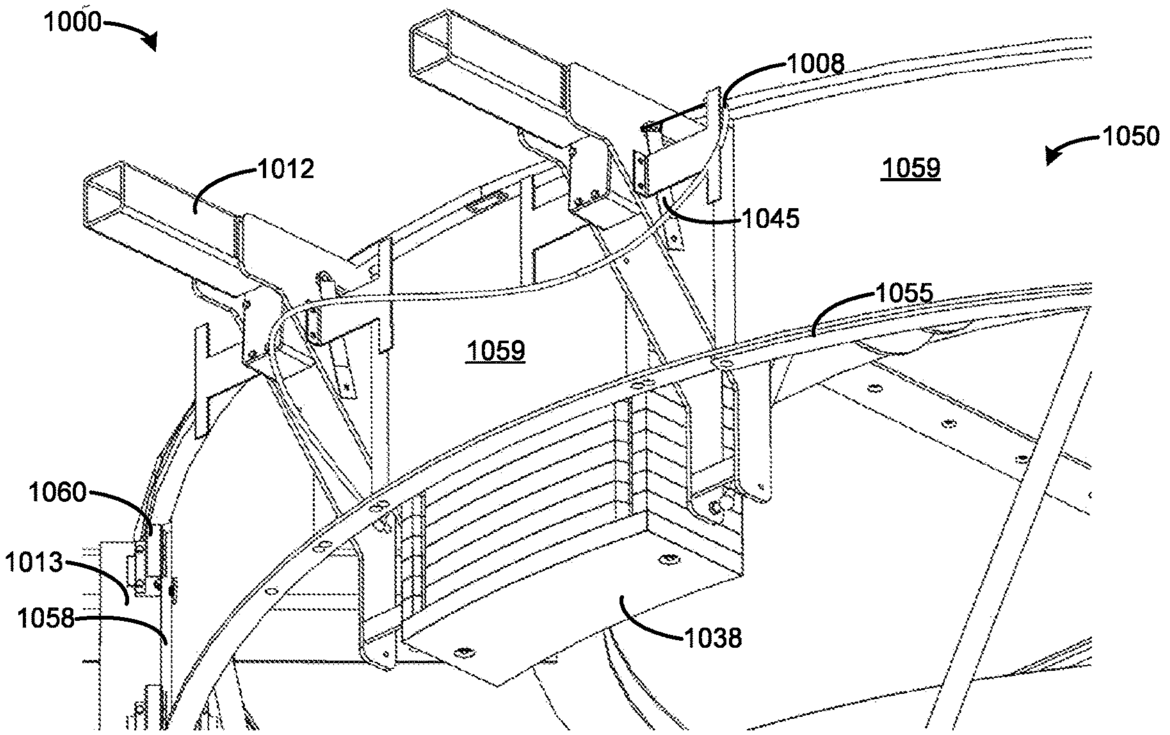
FIG. 10A is a perspective view of a system including a guard assembly and a counterweight corresponding to a closed configuration according to an example.

FIG. 10A is a perspective view of a system 1000 including a guard assembly 1050 and a counterweight 1038 corresponding to a closed configuration according to an example. The guard assembly 1050 is slidably mounted to support arms 1012 of the opening assembly via a plurality of shafts 1058, supported by bearings 1060 mounted to the support arms 1012 via brackets 1013. The guard panels 1059 of the guard assembly 1050 can easily slide past the counterweights 1038, even with the counterweights 1038 in the fully outward position corresponding to closed doors. The cable pull 1008 is shown coupled to the trunnion collar, held in place by the collar spring 1045.

In another embodiment, the support arms 1012 (shown as two individual arms in FIG. 10A) can be interconnected to each other. For example, a section of box tubing can be used as a cross-member (not shown) to serve as a cross-brace, ensuring the relative alignments of individual support arms 1012 does not become misaligned.

Figure 10B:
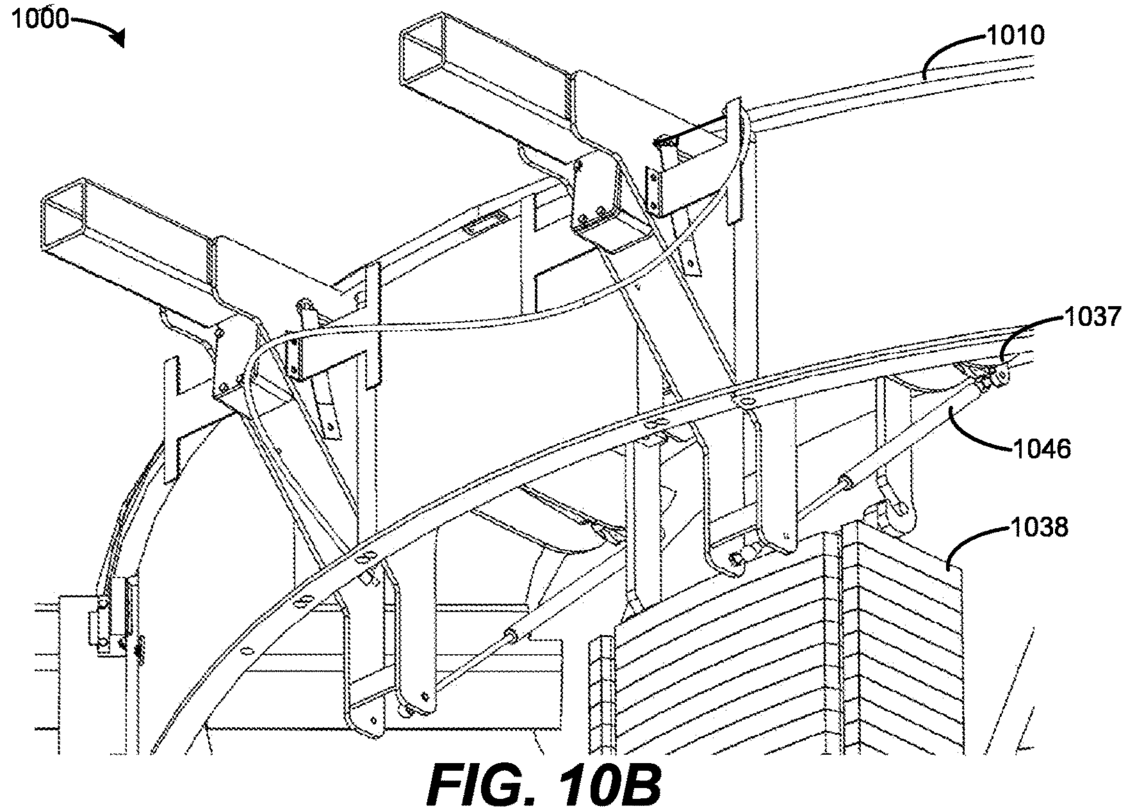
FIG. 10B is a perspective view of a system including a guard assembly and a counterweight corresponding to an open configuration according to an example.

FIG. 10B is a perspective view of a system 1000 including a guard assembly 1050 and a counterweight 1038 corresponding to an open configuration according to an example. The counterweight 1038 is now moved inward, away from the guard assembly 1050. Mount springs 1046 are shown extended, corresponding to the open door configuration.

FIG. 11 is a perspective inside view of a door actuation system 1134 including a plurality of mounts 1140 and a counterweight 1138 corresponding to an open configuration according to an example. The spacing is compact for the counterweights 1138, which conform to surrounding configurations in the illustrated ring-shaped embodiment, by nearly touching the ring-shaped guard assembly at an outer extent of the extended counterweights 1138, to almost contacting a curved wall of an enclosure cover at an inner extend of the counterweights 1138 in the illustrated lowered configuration of FIG. 11.

Figure 12C:
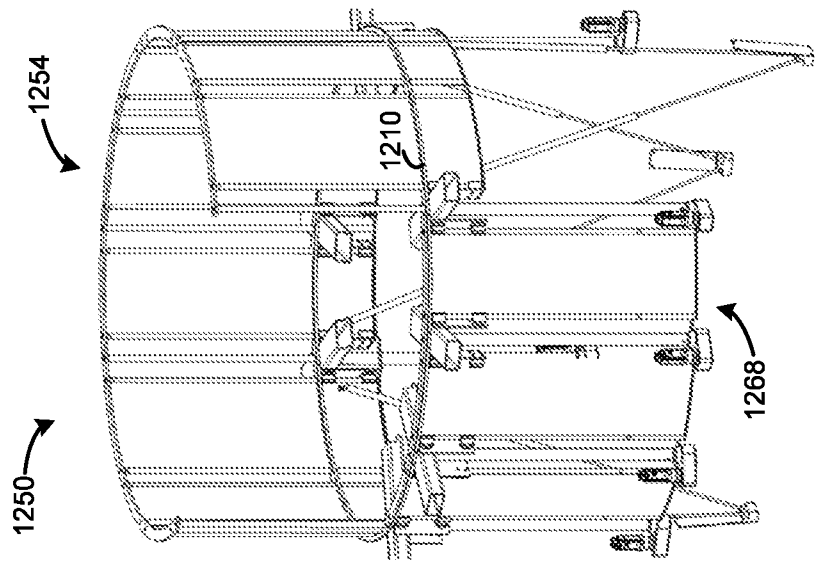
FIG. 12C is a perspective view of a guard assembly including a guardrail in a deployed configuration and gate in a retracted configuration according to an example.
Figure 12B:
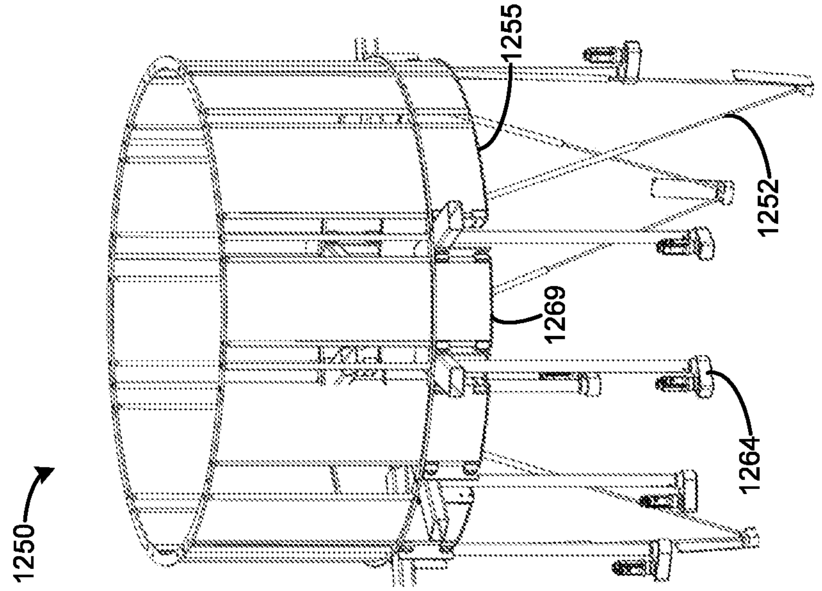
FIG. 12B is a perspective view of a guard assembly including a guardrail and gate in a deployed configuration according to an example.
Figure 12A:
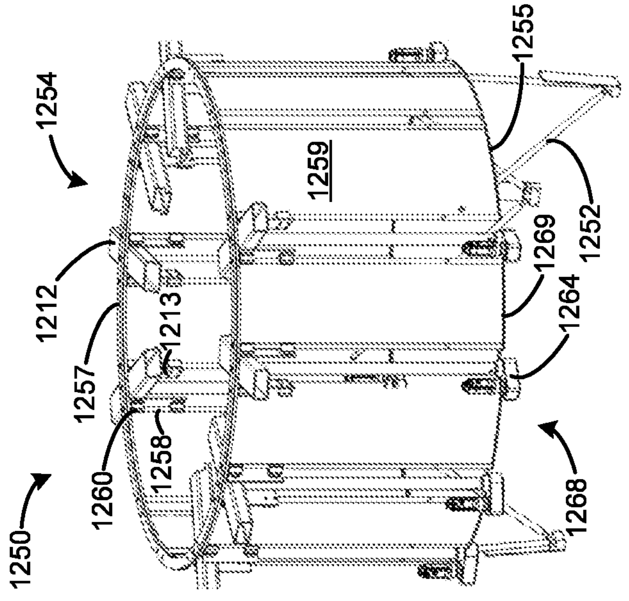
FIG. 12A is a perspective view of a guard assembly including a guardrail and gate in a retracted configuration according to an example.

FIG. 12A is a perspective view of a guard assembly 1250 including a guardrail 1254 and gate 1268 in a retracted configuration according to an example. A plurality of linear actuators 1264 are used to actuate the guard assembly 1250, allowing for independent actuation of the guardrail 1254 and the gate 1268. Guard springs 1252 are coupled to the guard assembly 1250 to bias the guard assembly 1250 toward a deployed configuration. Shafts 1258 are coupled to support arms 1212 via bearings 1260 mounted on bearing brackets 1213 coupled to the support arms 1212. In the retracted configuration of FIG. 12A, an upper guard support 1257 is proximate to the support arms 1212 at a floor level, and the lower guard support 1255 and lower gate support 1269 are proximate to the actuators 1264.

In other example embodiments, the linear actuators 1264 can be provided as a rack and pinion system having a rotating gear actuator to drive a rack disposed on a shaft of the guard assembly 1250.

The shafts 1258 of the guard assembly 1250 are supported by at least one linear bearing 1260, to slidably engage at least one shaft 1258 of the guard assembly 1250. At least one shaft 1258 has a customized diameter profile along a length of the at least one shaft 1258. In an example, the shaft 1258 has a wider diameter at one or more ends of the shaft, and narrower diameter away from the one or more ends of the shaft.

As illustrated, the gate 1268 spans one quarter circumference of the guard assembly 1250, and the guardrail 1254 spans the remaining three quarters circumference of the quadrant. Each of the three quadrants of the guardrail 1254 are braced with a set of two counter balancing gas springs 1252. The springs 1252 reduce the effective weight of the guardrail 1254, to an effective weight as little as zero in an embodiment, allowing the actuators 1264 to move more easily, faster, to carry more external load, and also to increase the safety of pinch points when closing by reducing the effective weight and increasing sensitivity to obstructions. The geometry of the spring layout is engineered to accommodate the cylindrical contents enclosed by the springs 1252 and guard assembly 1250, while remaining tight to the annular cylinder of the guardrail 1254 itself.

In other example embodiments, an underside of the guardrail 1254 and/or the upper rail of the gate 1268 includes a sensor (e.g., knife-edge sensor) to detect pressure, thereby detecting any obstructions beneath the guardrail 1254 and/or gate 1268, and allowing a control system to stop retraction of the guard assembly (and/or reverse the direction). In other embodiments, a sensor (e.g., a ring pressure gauge) is disposed between an upper face of one or more shafts of the guard assembly and a lower face of the guardrail 1254 and/or upper rail of the gate 1268. Accordingly, the system can detect an obstruction via a change in pressure between the rails and the shafts.

FIG. 12B is a perspective view of a guard assembly 1250 including a guardrail 1254 and gate 1268 in a deployed configuration according to an example. The support arms 1212 support linear bearing plate brackets 1213, which provide stability for the guard shafts 1258. Although the gate includes a lower gate support 1269, and the guardrail includes a lower guard support 1255, there is a discontinuity between the supports 1269 and 1255. In an embodiment, a box reinforcement is installed between the bearing plate brackets 1213 to reinforce and minimize flexing of the brackets, e.g., at the transition between the guardrail 1254 and the gate 1268. Additional reinforcement is possible by fixing the guard plates 1259 to the upper/lower guard supports 1257, 1255 and upper/lower gate supports, such that the guard panels 1259 serve as sheer walls to the guard assembly 1250. In alternate examples, the guard panels 1259 are not fixed to the guard supports, and are locked in place by securing the upper/lower guards to the shafts.

FIG. 12C is a perspective view of a guard assembly 1250 including a guardrail 1254 in a deployed configuration and gate 1268 in a retracted configuration according to an example. The guardrail 1254 and gate 1268 pass through the outer support 1210, which provides additional stability to the guard assembly 1250.

FIG. 13 is a bottom view of a guard assembly 1350 including guard actuators 1364 positioned beneath a support gap 1322 according to an example. The guard actuators 1364 are oriented at an angle relative to the circumference of the guard assembly 1350. In the illustrated embodiment, the guard actuators 1364 are set at 45 degrees relative to the circumference, to allow the actuator to keep tight to the wall of the enclosed space (e.g., outer circumference of the support gap 1322). In other embodiments, other angles are used, consistent with dimensions of the actuators and support gap 1322 enabling the actuators to fit within the constraints of the enclosed space. The support arms 1312 are visible above the actuators, through which the guard assembly is slidably mounted. The guard gas springs 1352 provide a bias toward the deployed configuration of the guard assembly 1350, e.g., to at least partially or fully offset a weight of the guard assembly 1350. The lower gate support 1369 provides reinforcement to secure the gate shafts and gate panels of the gate (not visible in FIG. 13). The lower guard support 1355 provides reinforcement to secure the guard shafts and guard panels of the guardrail (not visible in FIG. 13). The lower gate and guard supports 1355, 1369 are specifically configured to "zig-zag" around the various actuators, providing enhanced reinforcement and continuity between the various individual components of the guardrail and gate assemblies, while accommodating the guard actuators 1364 without interference when the guard assembly 1350 transitions between deployed and retracted configurations. Although a disconnect in continuity is present between the lower gate and guard supports 1355, 1369, the adjacent shaft bearing brackets facing the actuator can be reinforced, e.g., by a section of the support arm 1312 with a cutout to fit the actuator.

The guardrail and the gate fit around the inner diameter of the support gap 1322, e.g., the outside diameter of the storage assembly stack of wall accessories (not visible in FIG. 13; see storage assembly 590 in FIG. 5) enclosed by the guard assembly 1350. The guard assembly 1350 thereby encircles and occupies a tight space around the storage assembly. The actuators and the various engineering aspects of the guard assembly 1350 enable the guard assembly 1350 to maintain an aesthetically pleasing and comparatively small diameter having a tight fit relative to the enclosed space. Furthermore, the illustrated example configuration of the guard assembly 1350 is amenable to being added to an existing storage assembly, such as a pre-existing wine cellar, by digging a trench around the existing wine cellar corresponding to the support gap 1322, and then lowering the guard assembly 1350 into the trench for straightforward installation.

Figure 14:
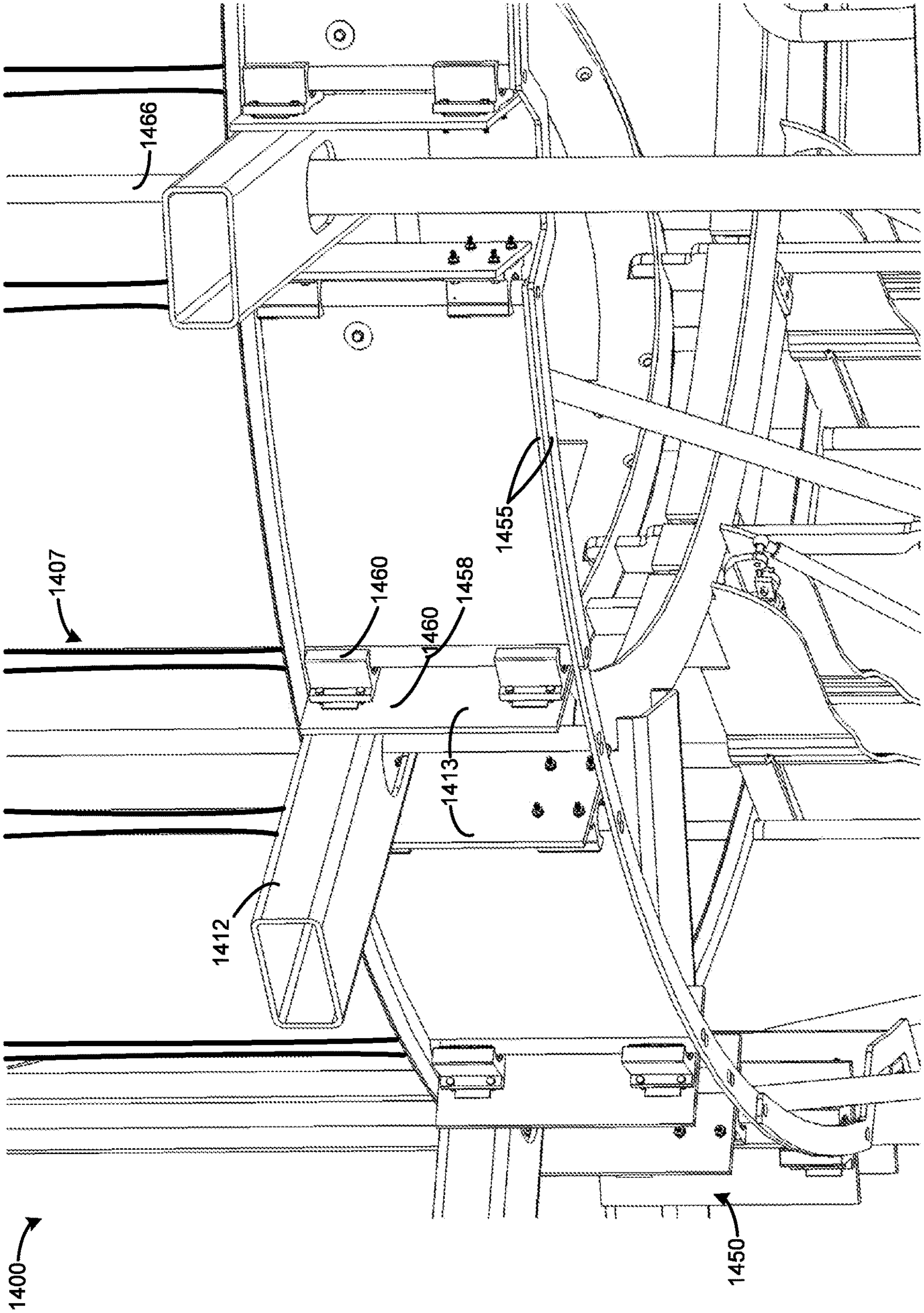
FIG. 14 is a perspective view of a system including a guard assembly including linear bearings and shafts in a deployed configuration according to an example.

FIG. 14 is a perspective view of a system 1400 including a guard assembly 1450 including linear bearings 1460 and shafts 1458 in a deployed configuration according to an example. The bearings 1460 are coupled to bearing brackets 1413, which are coupled to support arms 1412. The various components of the guard assembly 1450 are coupled to lower guard support 1455. The shafts 1458 have a diameter profile 1407, e.g., a non-constant diameter along a length of the shaft 1458.

From an engineering perspective, it is very difficult to independently actuate two shafts coupled together and slidably mounted via linear bearings, without causing binding at the bearings, even if the bearings are floating bearings. For example, over time, the actuators can deploy at slightly different rates, or begin movement at slightly different times. Even milliseconds of timing difference, or imperceptible actuation speeds, between two actuators can shift the orientation of the coupled shafts relative to the bearings, causing the actuated assembly of shafts to tilt relative to the bearings, resulting in binding of the shafts in the bearings. Such timing and speed issues are further exacerbated with increases in the length of the shaft and actuated stroke. Independently actuating four shafts coupled together and mounted via linear bearings is practically impossible without binding. However, the various example embodiments described herein have addressed such issues, and enable the use of any arbitrary number of shafts to be independently actuated, coupled together as a unit (e.g., as a guard assembly with tops and bottoms of the shafts coupled together via rails/supports), and slidably mounted via the shafts on linear bearings, without risk of binding the shafts in the bearings, regardless of the length of the shaft and stroke. Accordingly, embodiments described herein retain the strength and solid feel of a sturdy guard assembly, while enabling the entire assembly to be slidably actuated and supported by linear bearings, while enjoying a relatively long shaft and stroke length.

In an embodiment, the bearings 1460 are compensated bearings, which accommodate alignment variations and shaft strokes of approximately 10 inches. However, the guard assembly 1450 includes over 10 or 20 shafts that are coupled together and actuated together, over relatively much longer strokes, e.g., 42 inches. Such an engineered configuration risks breaking the bearings 1460, and/or prematurely wearing out the shafts 1458. For example, creating a moment greater than two-to-one of the sideways vs vertical loads, would result in binding. However, using a shaft whose entire diameter is reduced introduces slop into the guard assembly 1450 (including when fully deployed and/or retracted), causing the guard assembly 1450 to feel loose and sloppy when leaned on and/or stepped upon, because of the slop/play even when fully deployed, running contrary to the premium upscale aesthetics and engineering of the guard assembly 1450.

The varying diameter profile 1407, along the length of the stroke/length of the shaft 1407, enable the example embodiments of the guard assembly 1450 to make use of multiple shafts 1458 having relatively long strokes compared to the position of the paired bearings 1460. The use of linear bearings 1460, in contrast to roller bearings, also enables more flexibility in shaft material, e.g., the shafts 1458 do not require a harder steel such as chrome or hardened steel, and can use softer more aesthetically pleasing materials such as stainless steel. In an embodiment, the shafts 1458 are non-magnetic 300-series stainless steel, and have the diameter profile 1407 to ensure the guard assembly 1450 avoids slop, while also avoiding binding and premature shaft wear. In an embodiment, the linear bearings 1460 are based on frelon low-friction sliding material. In other embodiments, the linear bearings 1460 are based on rollers or ball bearings.

In the illustrated embodiment, the diameter profile 1407 corresponds to a larger diameter cylinder at the bottom of the shaft, to fully engage the rated diameter of one and/or both linear bearings 1460. The diameter of the shaft then reduces, to a smaller diameter that prevents binding and ensures smooth actuation and retraction throughout the stroke of the guard assembly.

The rate of change of the diameter profile 1407 can be based on various approaches, such as a taper along a majority of the shaft length, and/or a single reduction at a specific shaft position, multiple discrete changes in diameter along the shaft length, and other combinations. The diameter profile 1407 enables many actuated shafts 1458 to be kept parallel, whether actuated in motion, or held steady. Users can interact with the guard assembly 1450, which provides a firm steady handrail, without slop or unsteadiness, by virtue of the diameter profile 1407. The diameter profile 1407 enables the sides of the shafts to deviate imperceptibly from true parallel, providing the appearance of aesthetically pleasing parallel shafts, while allowing the sides of the shafts to have enough diameter variation for enhanced operation without binding. In other example embodiments, the diameter profile 1407 gives the shafts a noticeably non-parallel configuration for a noticeable aesthetic (e.g., slanted or tapered) effect and smoother operation. The lower extent of the shafts 1458 (and/or upper extent, in some embodiments) serve as a small subset of the entire shaft length, corresponding to the illustrated configuration of FIG. 14 wherein a parallel portion of the shafts 1458, corresponding to full diameter, are gripped securely by the linear bearings 1460. Thus, in the illustrated fully deployed configuration, the guard assembly 1450 is very secure with no slop. The use of the diameter profile 1407 reduces the distance needed for the shafts 1458 to remain parallel, and have an acceptable angle of non-parallelism in the remaining central portions of the shafts 1458. In an embodiment, the upper extent of the shafts 1458 can similarly be parallel full diameter sections, to provide a secure non-slop grip between the shafts 1458 and the bearings 1460 when the guard assembly 1450 is in the retracted configuration (thus providing secure footing when stepped upon). However, users typically do not lean on or grip the handrail when it is fully retracted, so embodiments can accept a reduced diameter profile at the upper extent of the shafts 1458 without negatively impacting user experience and premium feel of the deployed guard assembly 1450.

The shaft 1458 is shown with two linear bearings 1460 to position the shaft 1458. The two linear bearings 1460 are spaced apart from each other by approximately seven inches. In other examples, a greater or fewer number of linear bearings 1460 are used. For example, three (or more) linear bearings 1460 can be used to stabilize the same shaft, providing stability spread across more than one linear bearing 1460. The diameter profile thus can correspondingly vary between each location on the shaft corresponding to a location of a linear bearing (e.g., the shaft has full diameter at each of the three locations of the bearings when the shaft is fully deployed, and tapers to a reduced diameter outside the extent of the bearings. In other examples, that shaft can employ three different diameter profiles, above each of the three bearing positions at the fully deployed shaft. The shafts 1458, in the deployed configuration, extend another 42 inches above floor level, for a total of approximately 54-⅛ inches for an example shaft length. In some embodiments, one of the linear bearings 1460, either the upper or the lower, corresponds to the location of the shaft 1458 where the full diameter is contained. For example, if the full diameter of the shaft 1458 is located at the upper bearing 1460, then the shaft diameter at the lower bearing and remainder of the upper shaft are reduced, and vice versa. In other embodiments, the upper and lower bearings 1460 both correspond to a full diameter, and the intervening shaft length between the linear bearing positions can be full diameter and/or can use a reduced diameter or diameter profile. The diameter profile 1407 can be used to provide a rate of engagement that avoids jerking movement of the actuated guard assembly, in view of an actuation rate and angle of deflection allowed by the diameter profile 1407. For example, the diameter profile 1407 includes a taper that follows a mathematical pattern, or transitions to the full diameter asymptotically, parabolically, or according to other mathematical expressions.

In an example embodiment, the diameter profile 1407 is engineered to accommodate a linear bearing float feature, which allows the linear bearing 1460 to accommodate approximately ½ degree deflection in either direction, allowing the linear bearing to align itself. Accordingly, a non-symmetric diameter profile 1407 can be used. A combination of different diameter profiles 1407 can be spread across multiple different shafts 1458. For example, first diameter profiles 1407 can be used on even numbered shafts 1458, and second diameter profiles 1407 can be used on odd numbered shafts 1458. The first and second diameter profiles 1407 can be complementary in nature, to ensure that binding and premature wear are avoided, while also minimizing slop in the guard assembly 1450. In other embodiments, one half of the full guard assembly circumference worth of the shafts use a first diameter profile, and the other half use a second diameter profile. In another embodiment, the second diameter profile of the remaining half is a full diameter, non-tapered straight shaft, allowing the first half of the guard assembly to float, and the remaining half to be fixed.

The bearing mounting plates 1413 are used to mount the linear bearings 1460 on the support arms 1412. The bearing plates 1413 include slotted holes to allow for some adjustment of the linear bearing orientation. If the deployed guard assembly 1450 were pushed, the upper linear bearing 1460 and the lower linear bearing would stabilize the guard assembly 1450, resisting moments/torque induced by extremely large forces by virtue of the multiple linear bearings and the multiple shafts 1407.

In the illustrated example, the guard assembly 1450 has 26 shafts. Each of eight support arms 1412 has two linear bearings on each side, four total per support arm 1412, with 16 shafts for the guardrail portion of the guard assembly, along with the actuator itself which provides a shaft as a screw with a covering sleeve. The actuator shaft is attached in six places along the guard assembly 1450. Accordingly, there are 26 shafts and six actuators for the guardrail (and additional for the gate). The actuator shafts provide six additional shafts, for 32 total.

In example embodiments, the actuator rod 1466, which is extendable from the actuator, is used as part of the guard assembly rail system, wherein the actuator rod 1466 itself serves as a shaft in conjunction with the shafts 1458. In other example embodiments, a plurality of actuator rods 1466 provide support for the guard assembly 1450, by taking the place of at least one shaft 1458. In an embodiment, the guard assembly 1450 does not include shafts 1458, and is supported by a plurality of actuator rods 1466, e.g., spaced apart by four inches from each other going around the guard assembly 1450.

The customized diameter profile 1407 of the shaft 1458 enables the system to lock in place the guard assembly 1450 when deployed (or retracted, optionally), while avoiding binding in a multi-shaft parallel shaft configuration. This avoids binding and/or premature wear in the bearings 1460 and/or the actuators.

Figure 15A:
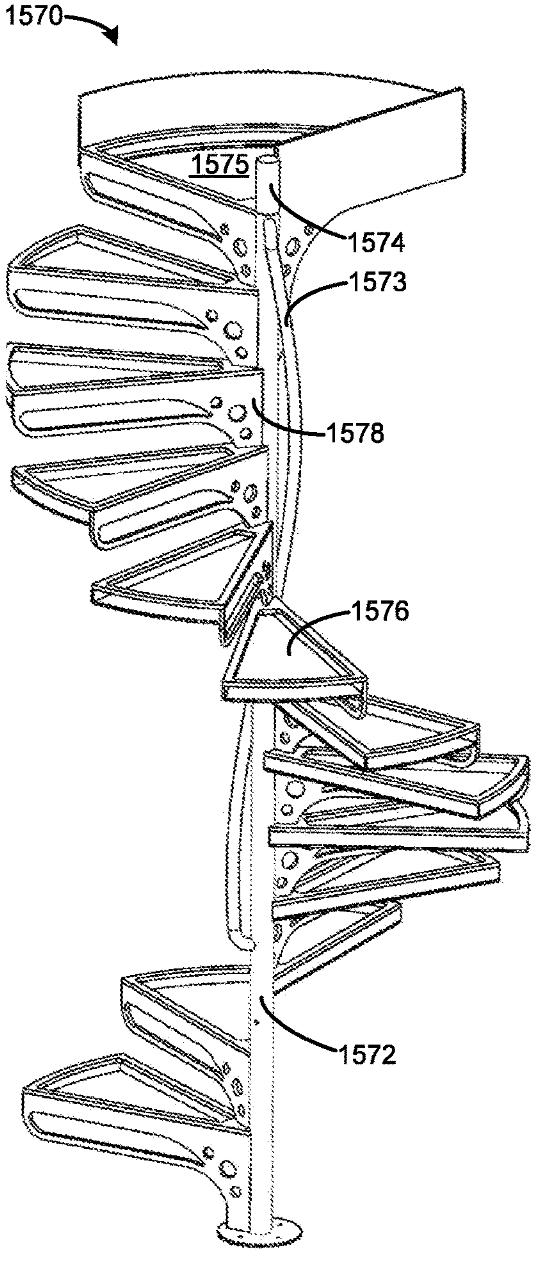
FIG. 15A is a side perspective view of an access assembly including steps, webbing, and a post in a retracted configuration according to an example.

FIG. 15A is a side perspective view of an access assembly 1570 including steps 1576, webbing 1578, and a post 1574 in a retracted configuration according to an example. A handrail 1573 is disposed around a central support 1572, and a landing 1575 is located at a top of the access assembly 1570, with elevated guards flanking a side and back of the landing 1575.

The illustrated landing 1575 is a wedge of 90 degrees, and includes a cutout to receive an inlay such as stone or transparent laminated glass. In alternate examples, the landing 1575 is solid, e.g., metal. The steps 1576 are steel, and similar to the landing 1575, can include an insert such as stone, concrete, glass, quartz, and the like. The various structural members can be formed of metal such as steel or aluminum.

The strength of the example staircase is provided via the webbing 1578, enabling the steps to be cantilevered without a need for an exterior support, thereby using that freed exterior space to increase the side-to-side clearance for the ingress/egress path along the staircase.

The illustrated features of the staircase enabled the achievement of additional clearance also by having a reduced newel post 1574 and central support 1572, smaller than what is found in an off-the-shelf spiral staircase. Because reducing the diameter of the post 1574 and central support 1572 is associated with a corresponding reduction in strength of the central support 1572 of the staircase, the illustrated access assembly 1570 provides strength through the steps 1576 themselves, e.g., via the webbing and the vertical coupling of the steps to each other. Thus, the lateral clearance of the staircase is maximized, without requiring that the steps 1576 be connected to the wall of the enclosed space and/or blocks of the storage assembly. The steps 1576 are coupled to each other via reinforced webbing, to protect the central support 1572 from bending or deforming when under load.

Figure 15B:
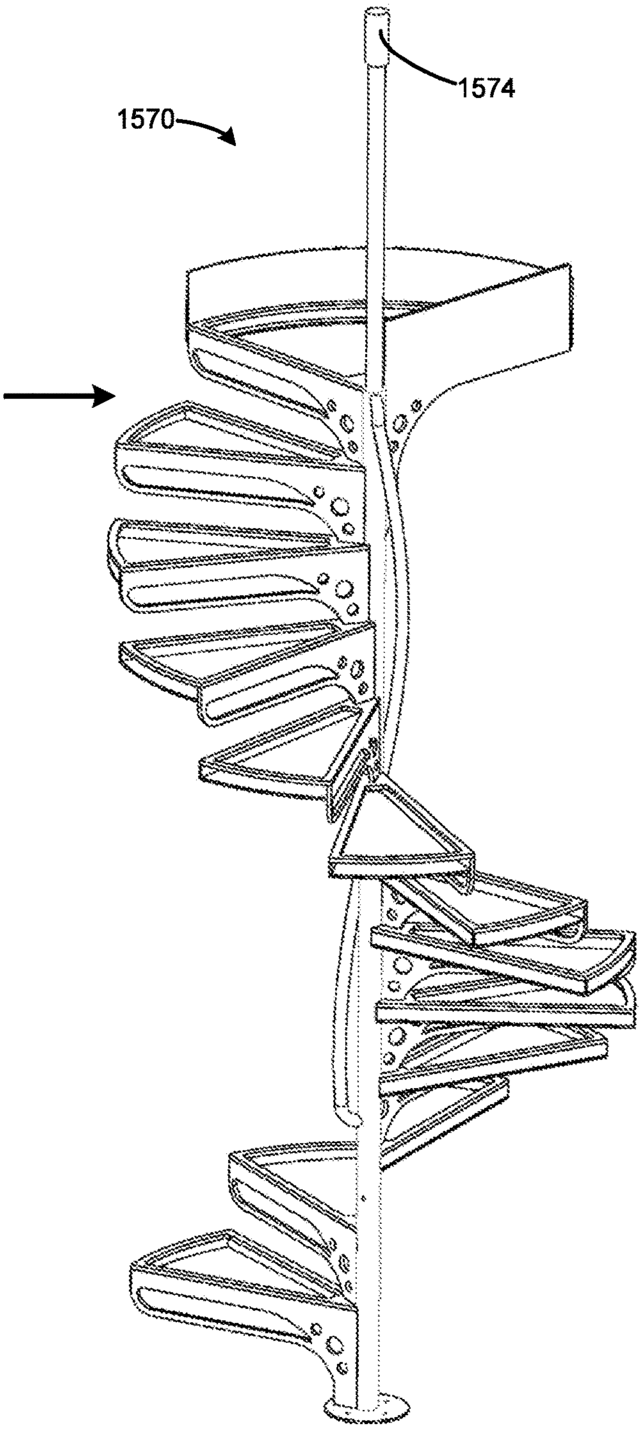
FIG. 15B is a side perspective view of the access assembly including steps, webbing, and the post in an extended configuration according to an example.

FIG. 15B is a side perspective view of the access assembly 1570 including steps 1576, webbing 1578, and the post 1570 in an extended configuration according to an example. The post 1570 serves as a newel post and handrail when entering or exiting a top of the staircase, and is configured to extend to a height sufficient to meet building codes or safety guidelines. The illustrated newel posts 1574 is shown with a basic cylindrical knob. In other examples, a custom designed knob or other feature is coupled to the top of the newel post 1574. In an example, the knob serves as a cushion and pusher to interact with the doors, which are located directly above the post 1574.

Figure 16:
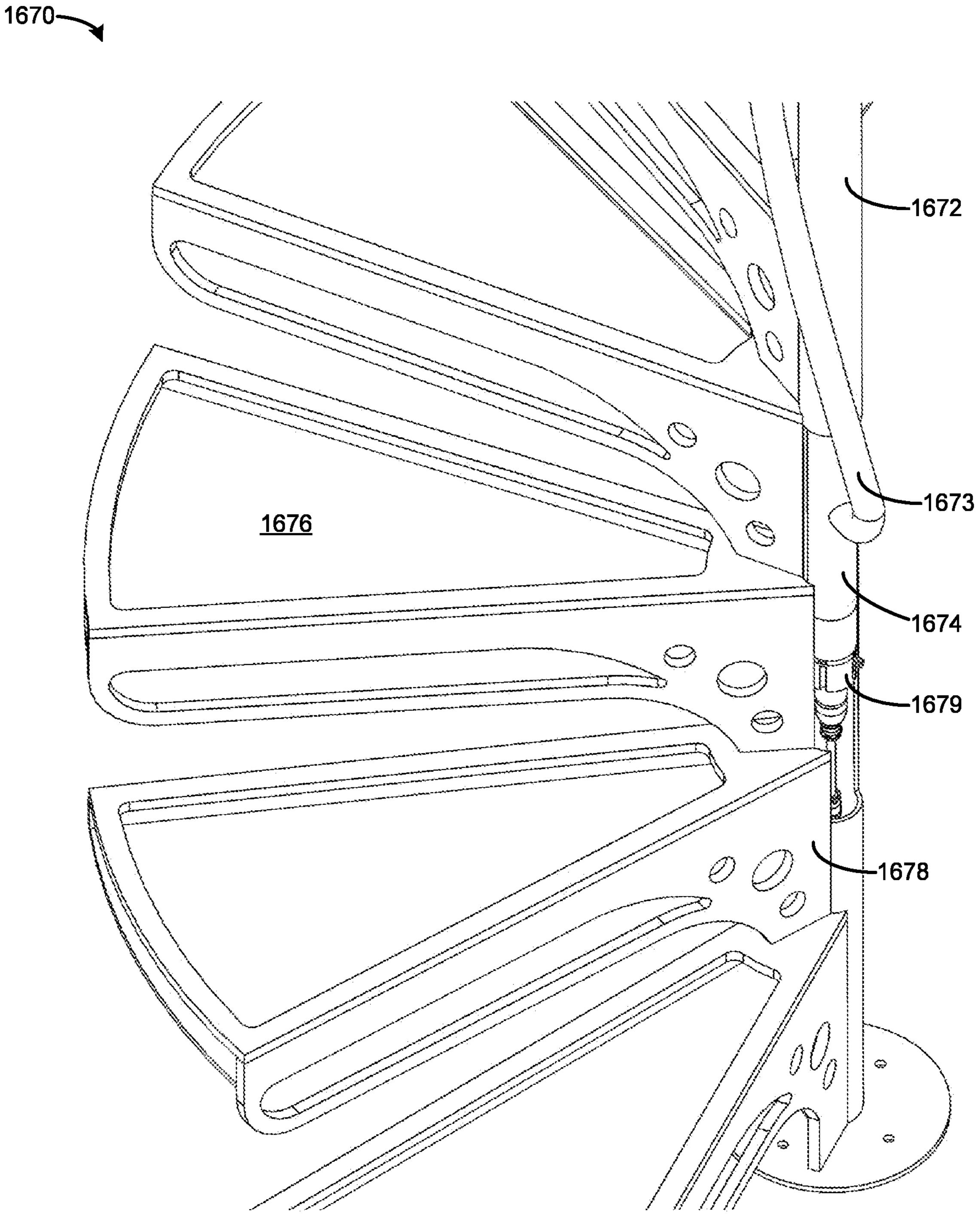
FIG. 16 is a side perspective view of an access assembly including steps, webbing, a center support, and a post according to an example.

FIG. 16 is a side perspective view of an access assembly 1670 including steps 1676, webbing 1678, a central support 1672, and a post 1674 according to an example. A section of the central support 1672 is removed to reveal the actuator 1679 inside. A set screw is also visible in FIG. 16, to secure the actuator 1679 and post 1674 from sliding within the central support 1672, and assisting to support the doors when in a closed configuration presenting a closed surface carrying a load (e.g., a crowd of people).

The webbing 1678 of the steps 1676 are welded together, providing strength in the steps 1678 themselves (independent of the central support 1672), and allowing for a reduced diameter of the central support 1672 and newel post 1674 inside the central support 1672. In the illustrated embodiment, the steps 1676 are designed so that the webbing 1678 of one step 1676 is fixed to the top of the next step 1676. Accordingly, heavy duty welding is not needed between the steps 1676 and the central support 1672, and just enough welding is used, sufficient to secure the steps 1676 to the central support 1672. In an embodiment, the central support 1672 is removed entirely, with the structural integrity provided by the stairs 1676 and their webbing 1678. The handrail 1673 complies with code, formed as a helical structure going around the central support 1672.

Figure 17:
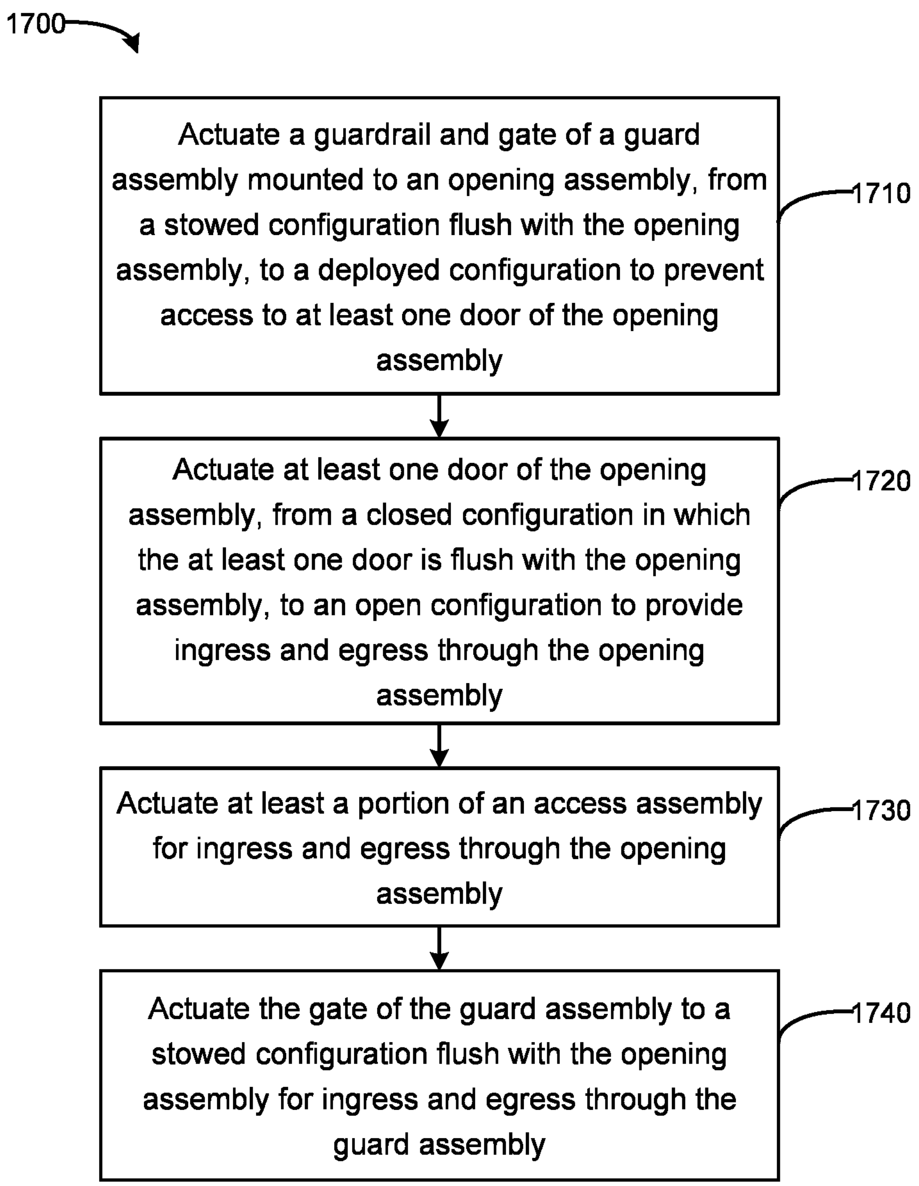
FIG. 17 is a flow chart based on actuating a system of assemblies according to an example.

Referring to FIG. 17, a flow diagram is illustrated in accordance with various examples of the present disclosure. The flow diagram represents processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 17 is a flow chart 1700 based on actuating a system of assemblies according to an example. In block 1710, a guardrail and gate of a guard assembly mounted to an opening assembly are actuated from a retracted configuration flush with the opening assembly, to a deployed configuration to prevent access to at least one door of the opening assembly. For example, the opening assembly includes a plurality of doors and is suspended via support arms to a periphery of an enclosed region. The guard assembly is suspended from the opening assembly, e.g., mounted to the support arms.

In block 1720, at least one door of the opening assembly is actuated, from a closed configuration in which the at least one door is flush with the opening assembly, to an open configuration to provide ingress and egress through the opening assembly. For example, a pair of semicircular doors form a circle when closed, and open to a full 90 degree orientation for ample headroom.

In block 1730, at least a portion of an access assembly is actuated for ingress and egress through the opening assembly. For example, an elevator is moved to a loading position to accept at least one person. In other examples, a newel post of a staircase is extended.

In block 1740, the gate of the guard assembly is actuated to a retracted configuration flush with the opening assembly for ingress and egress through the guard assembly. For example, a quarter segment of the guard assembly is formed as a gate that is separately actuatable, independent of the guardrail (remaining three-quarters of the guard assembly), doors, and access assembly. In an example, the gate operates according to a dead man's switch, which is hidden from view.

In another example, the opening assembly includes various accessories, and the control system is further configured to actuate an accessory coupled to the opening assembly, from a retracted configuration flush with the opening assembly, to a deployed configuration accessible above the opening assembly. An accessory can be provided as an extension of the guard assembly, such that actuation of the guardrail serves to deploy the accessory (e.g., a shelf provided as an extension of the guardrail).

Example embodiments of the systems described herein can use a control screen for information display and for receiving commands, while also housing a system controller. A large touchscreen, e.g., 10 inches, serves as a display to show illustrations, instructions, provide an interactive keypad screen, provide an open/close screen, provide a message screen ("stand clear from cellar," "wine cellar occupied—screen locked," and the like). The control screen can be wirelessly interfaced with the system.

In an embodiment, the following operating sequence and fail safes are used.

1. Wine cellar is closed; handrail, guard, and doors are actuated in closed, or down, positions. Cellar door and guard are flush with floor.

2. User approaches user touchscreen mounted on nearby wall and inputs four-digit code to activate cellar opening sequence. Simultaneously, panel flashes with verbiage of "Stand clear from cellar," (Visual safety #1); lights in cellar begin to flash (Visual safety #2); female voice states, "Stand clear of cellar and railing" (Audible alarm #1); and alarm beeps (Audible alarm #2).

3. Guard begins to rise. (Fail safe #1: Guard will not rise if anyone is standing on it due to sensors on circuit control.)

4. Guard rises to 42-inch high position and is friction-locked in place.

5. Cellar doors begin to open once guard is in the up position. (Fail safe #2: Doors will not rise if anyone is standing on them due to sensors on circuit control; sequence stops and reverses; guard lowers and user touchscreen resets.)

6. Doors fully open and center post handrail rises from center column to provide 36-inch high handrail at landing.

7. User leaves user touchscreen and walks to guard, pushes momentary guard control switch, and ¼ section of guard retracts into floor to allow entry and is friction-locked in place. (Fail safe #3: guard switch cannot activate until doors and handrail are fully open.) (Fail safe #4: Any obstruction will prevent section of guard from lowering or raising due to sensors on circuit control; guard will stop and reset.) (Audible and visual alarms per Step #2 are in effect again.)

8. User and guests step inside of guard onto stair landing; guests enter cellar. User releases momentary guard control switch, guard raises, user touchscreen resets to code input mode and indicates "Wine cellar occupied—screen locked." (Fail safe #5: Wall panel cannot activate guard while any motion is detected inside cellar.)

9. User retrieves wine from cellar. (Fail safe #6: If there is a power failure, doors in up position remain open since they are counter weighted, have redundant pneumatic pistons, as well as actuators that are friction locked.)

10. User walks up stairs to landing, pushes momentary guard control switch, and ¼ section of guard retracts into floor to allow exit. (Audible and visual alarms per Step #2 are in effect again.)

11. User and guests exit landing, user releases momentary guard control switch, guard raises, and user walks back to user touchscreen. (Audible and visual alarms per Step #2 are in effect until guard is fully raised.) (Fail safe #7: If doors are accidentally closed with someone inside there are several options: 1) user can activate door from user touchscreen, 2) emergency electrical safety override switch can be pushed from inside cellar, or 3) manual release pull can be used.) The cellar has been designed with redundant systems to prevent the possibility of cellar doors closing while occupied. However, in case of an unforeseen condition, redundant exit strategies are also provided.

12. User inputs four-digit code to reactivate user touchscreen and presses "close" button to retract handrail first, then cellar doors close, then guard lowers. The beginning sequence is repeated in reverse. (Audible and visual alarms per Step #2 are in effect again.) (Fail safe #8: Handrail will only retract if cellar interior sensors do not trigger.)

13. Cellar is now closed.

In example embodiments, an entire control system is custom programmed for operating the various actuators of the various assemblies of the system. Accordingly, various aesthetically pleasing actuation flourishes are included, such as synchronized movements, or components starting from a coupled position and moving at different rates to then synchronize and reunite simultaneously. In an example, the door actuates based on a short pop of 1 inch from the floor, pausing for a half second, and then continuing up. The short pop provides a noticeable visual flourish as well as a safety feature, serving notice to bystanders that the gate will be actuating soon (enabling bystanders to step back or otherwise get out of the way). In another example embodiment, the actuation of the gate and guardrail is controlled such that the height of the gate does not exceed the height of the guardrail. For example, when deploying from the floor position, the guardrail begins deploying first, and later the gate deploys, to eventually catch up with the guardrail in reaching the deployed configuration of the guard assembly. When retracting from the deployed position, the gate begins retracting first, to remain below a level of the guardrail, while both complete the retraction motion. Various custom safety features are enabled, such as the gate rising back into place if the dead man's switch is released before the gate is fully lowered for access. Once fully lowered, a programmed time delay of a predetermined duration, e.g., 15 seconds, is used before the gate raises back up. This process can be used for ingress or egress, e.g., when the user returns back out of the cellar and needs to lower the gate again (which had already automatically raised up for safety, while they were inside the cellar).

In an embodiment, the system includes a control panel, e.g., installed on a wall of the room installed with the cellar. The control panel includes controls enabling a user to present a fingerprint or access code to open the cellar door and raise the guardrail. The gate can default to a deployed configuration until a fingerprint is recognized by the sensor on the guardrail, e.g., located next to the doors of the opening assembly, and/or built into the guardrail.

In an embodiment, the system is capable of storing and recognizing multiple fingerprints, and also is programmed to identify which specific fingerprint was used to lower the gate, and to refuse other fingerprints until the specific fingerprint is received before again lowering the gate. Accordingly, the system is capable of admitting a user into the cellar via fingerprint, and denying entry of others until that person exits the cellar. The system can be programmed to enable recognition of select programmed individuals, as selected by an administrator, and deny others. In other embodiments, other forms of user authentication are used, such as retina scan, facial detection, voice recognition, or other biometric authentication. Non-biometric forms of authentication can be used, such as using a security token, radio-frequency identification (RFID), one-dimensional or two-dimensional barcodes (QR codes), and the like.

The various actuated system are capable of detecting anomalies and defaulting to a safe operation and/or condition in response. For example, when the doors are closing and the controller detects an over-torque value from the door actuators (e.g., due to some resistance in door movement), the controller will direct the door actuators to slowly reverse the motion of the doors toward the open configuration, and stop at a safe 80-degree (nearly fully open) position just shy of the full 90-degree open configuration. In the safe configuration, the system can request a new cycle of the guard gate dead man's switch being pressed, to then reset and close the doors again. The brake system of the actuators further enhances safety, allowing the controller to halt the system quickly and safely in situations other than power failure, such as when an over torque is sensed in the system.

In an embodiment, the last six inches of the retraction of the gate into the floor is performed under a substantially limited torque condition, using a relatively much lower torque value compared to other portions of the actuation, in order to provide safety (e.g., protect feet being pinched under the upper gate support as it approaches floor level for full retraction of the gate). The control system records values of motor torque (e.g., plots the torque over time) so that over time, e.g., years, data is accumulated for normal behavior, allowing the system to recognize deviations from such a large body of data to be able to classify such deviations as abnormal functions that the system then reports to the manufacturer for an automatically generated servicing request or inspection.

Examples of the control systems provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., including a controller and/or processor of a computing device) can include and/or receive a tangible non-transitory computer-readable medium storing a set of computer-readable instructions (e.g., software, firmware, etc.) to execute the methods described above and below in the claims. For example, a system can execute instructions to direct an opening assembly system engine to open and close doors, and a guard assembly system engine to deploy and retract a guardrail, gate, and access assembly, wherein the engine(s) include any combination of hardware and/or software to execute the instructions described herein. As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A system comprising:

a guard assembly actuatable between a retracted configuration and a deployed configuration to serve as a guard;

the guard assembly including a plurality of shafts bound on their upper ends by an upper guard support and bound on their lower ends by a lower guard support; and a plurality of linear bearings to slidably engage the plurality of shafts of the guard assembly, and wherein at least one shaft of the plurality of shafts has a customized diameter profile comprising a non-constant diameter along a length of the at least one shaft;

the customized diameter profile comprising multiple discrete changes in diameter along the shaft length, between a full diameter corresponding to being gripped securely by the linear bearings, and a reduced diameter allowing for slop between a linear bearing and the at least one shaft.

2. The system of claim 1, further comprising a plurality of guard actuators to actuate the guard assembly.

3. The system of claim 1, wherein the guard assembly has a circular configuration and the plurality of guard actuators comprises four guard actuators evenly distributed around a circumference of the guard assembly.

4. The system of claim 3, wherein the plurality of guard actuators are set with a thread pitch that, when power is lost, friction lock the guard assembly in place resisting gravity.

5. The system of claim 1, further comprising at least one guard panel disposed between a given pair of the plurality of shafts to provide safety protection.

6. The system of claim 1, further comprising a plurality of guard springs coupled to the guard assembly to bias the guard assembly toward the deployed configuration and reduce an effective weight of the guard assembly.

7. The system of claim 1, the customized diameter profile comprising a single reduction in diameter at a shaft position beyond a section of the shaft that is gripped by linear bearings when the guard assembly is in the deployed configuration.

8. The system of claim 1, wherein a lower portion of the at least one shaft corresponds to a full diameter section that enables a secure non-slop grip by the plurality of linear bearings when the guard assembly is in the deployed configuration.

9. The system of claim 1, wherein an upper portion of the at least one shaft corresponds to a full diameter section that enables a secure non-slop grip by the plurality of linear bearings when the guard assembly is in the retracted configuration.

10. The system of claim 1, wherein the customized diameter profile tapers in diameter from a full diameter section to a reduced diameter section according to a parabolic curve to allow for smooth engagement of the linear bearings coming in contact with the full diameter section and the reduced diameter section of the at least one shaft.

11. The system of claim 1, wherein at least two of the plurality of linear bearings are positioned at a given one of the plurality of shafts, the at least two linear bearings being spaced apart from each other along the shaft according to a bearing spacing.

12. The system of claim 11, wherein the customized diameter profile of the at least one shaft includes a plurality of sections of the shaft having a full diameter to be gripped by the linear bearings in a non-slop grip, the plurality of sections of the shaft being spaced apart from each other along the shaft according to the bearing spacing with reduced portions between and beyond the full diameter plurality of sections.

13. The system of claim 11, wherein the customized diameter profile of the at least one shaft includes a section of the shaft having a full diameter to be gripped by one of the at least two linear bearings in a non-slop grip in the deployed configuration, a diameter of the at least one shaft tapering to a reduced diameter beyond the section to enable a remaining one of the at least two linear bearings to grip the shaft with a slop grip in the deployed configuration.

14. The system of claim 1, wherein the plurality of linear bearings include linear bearing float features to allow the plurality of linear bearings to accommodate approximately a half-degree deflection in either direction, allowing the linear bearing to align itself to deflections of the guard assembly.

15. The system of claim 1, wherein the plurality of shafts include a plurality of different diameter profiles distributed across multiple different shafts.

16. The system of claim 15, wherein even-numbered shafts have a first diameter profile, and odd-numbered shafts have a second diameter profiles.

17. The system of claim 16, wherein the first diameter profile corresponds to straight shafts having constant full diameters along their entire lengths, and wherein the second diameter profile corresponds to each shaft having at least one full diameter portion and at least one reduced diameter portion.

18. The system of claim 1, wherein the customized diameter profile comprises more than one discrete change in diameter along the shaft length, the discrete changes being separated from each other along the shaft length.

19. The system of claim 1, wherein the guard assembly has a stroke length of 42 inches, to enable the deployed configuration to extend the plurality of shafts and the upper guard support 42 inches.

* * * * *